US007338369B2

(12) United States Patent
Mierau et al.

(10) Patent No.: US 7,338,369 B2
(45) Date of Patent: Mar. 4, 2008

(54) GAMING DEVICE HAVING AN ACCUMULATING AWARD SYMBOL

(75) Inventors: Marc Mierau, Reno, NV (US); Karen M. Cregan, Reno, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/421,963

(22) Filed: Jun. 2, 2006

(65) Prior Publication Data

US 2006/0217183 A1 Sep. 28, 2006

Related U.S. Application Data

(63) Continuation of application No. 10/987,457, filed on Nov. 12, 2004, now Pat. No. 7,056,214, which is a continuation of application No. 10/158,545, filed on May 29, 2002, now Pat. No. 6,958,013, which is a continuation-in-part of application No. 09/963,721, filed on Sep. 26, 2001, now Pat. No. 6,602,137.

(51) Int. Cl.
*A63F 13/00* (2006.01)

(52) U.S. Cl. ........................................................ 463/20

(58) Field of Classification Search ............ 463/16–22, 463/25–27, 29–32, 37, 40, 42; 273/143 R
See application file for complete search history.

(56) References Cited

U.S. PATENT DOCUMENTS 1,527,929 A 2/1925 Simons
3,642,287 A 2/1972 Lally et al.
4,182,515 A 1/1980 Nemeth
4,448,419 A 5/1984 Telnaes
4,560,161 A 12/1985 Hamano
4,582,324 A 4/1986 Koza et al.
4,624,459 A 11/1986 Kaufman
4,695,053 A 9/1987 Vazquez, Jr. et al.
4,775,155 A 10/1988 Lees
4,874,173 A 10/1989 Kishishita
4,991,848 A 2/1991 Greenwood et al.

(Continued)

FOREIGN PATENT DOCUMENTS

EP 0688002 A1 12/1995

(Continued)

OTHER PUBLICATIONS

Bingo Advertisement, written by Casino Data System, published 1998.

(Continued)

*Primary Examiner*—Kim Nguyen
(74) *Attorney, Agent, or Firm*—Bell, Boyd & Lloyd LLP

(57) ABSTRACT

A gaming device and method which includes a plurality of reels having multiple symbols on the reels. The symbols include at least one activator symbol. In one embodiment, if the player obtains an activator symbol on the reels, the activator symbol activates the symbols that are adjacent to the activator symbol. Activating the adjacent symbols reveals the awards associated with the adjacent symbols. The player receives an award that equals the activator symbol award plus the awards associated with each symbol that is adjacent to the activator symbol.

49 Claims, 12 Drawing Sheets

U.S. PATENT DOCUMENTS

| | | | |
|---|---|---|---|
| 5,046,737 | A | 9/1991 | Fienberg |
| 5,116,055 | A | 5/1992 | Tracy |
| 5,152,529 | A | 10/1992 | Okada |
| 5,178,390 | A | 1/1993 | Okada |
| 5,205,555 | A | 4/1993 | Hamano |
| 5,315,660 | A | 5/1994 | Anderson et al. |
| 5,322,295 | A | 6/1994 | Cabot et al. |
| 5,342,047 | A | 8/1994 | Heidel et al. |
| 5,344,144 | A | 9/1994 | Canon |
| 5,380,007 | A | 1/1995 | Travis et al. |
| 5,437,451 | A | 8/1995 | Fulton |
| 5,449,173 | A | 9/1995 | Thomas et al. |
| 5,456,465 | A | 10/1995 | Durham |
| 5,524,888 | A | 6/1996 | Heidel |
| 5,536,016 | A | 7/1996 | Thompson |
| 5,542,669 | A | 8/1996 | Charron et al. |
| 5,647,798 | A | 7/1997 | Falciglia |
| 5,722,891 | A | 3/1998 | Inoue |
| 5,743,524 | A | 4/1998 | Nannicola |
| 5,769,716 | A | 6/1998 | Saffari et al. |
| 5,772,509 | A | 6/1998 | Weiss |
| 5,788,573 | A | 8/1998 | Baerlocher et al. |
| 5,823,873 | A | 10/1998 | Moody |
| 5,823,874 | A | 10/1998 | Adams |
| 5,833,536 | A | 11/1998 | Davids et al. |
| 5,848,932 | A | 12/1998 | Adams |
| 5,851,148 | A | 12/1998 | Brune et al. |
| 5,855,514 | A | 1/1999 | Kamille |
| 5,882,261 | A | 3/1999 | Adams |
| 5,902,184 | A | 5/1999 | Bennett et al. |
| 5,911,418 | A | 6/1999 | Adams |
| 5,919,088 | A | 7/1999 | Weiss |
| 5,927,714 | A | 7/1999 | Kaplan |
| 5,947,820 | A | 9/1999 | Morro et al. |
| 5,951,397 | A | 9/1999 | Dickinson |
| 5,980,384 | A | 11/1999 | Barrie |
| 5,997,401 | A | 12/1999 | Crawford |
| 6,004,207 | A | 12/1999 | Wilson, Jr. et al. |
| 6,015,346 | A | 1/2000 | Bennett |
| 6,033,307 | A | 3/2000 | Vancura |
| 6,056,642 | A | 5/2000 | Bennett |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,102,798 | A | 8/2000 | Bennett |
| 6,113,098 | A | 9/2000 | Adams |
| 6,120,031 | A | 9/2000 | Adams |
| 6,126,542 | A | 10/2000 | Fier |
| 6,146,273 | A | 11/2000 | Olsen |
| 6,149,156 | A | 11/2000 | Feola |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,174,235 | B1 | 1/2001 | Walker et al. |
| 6,190,254 | B1 | 2/2001 | Bennett |
| 6,190,255 | B1 | 2/2001 | Thomas et al. |
| 6,203,429 | B1 | 3/2001 | Demar et al. |
| 6,224,483 | B1 | 5/2001 | Mayeroff |
| 6,231,442 | B1 | 5/2001 | Mayeroff |
| 6,254,481 | B1 | 7/2001 | Jaffe |
| 6,261,177 | B1 | 7/2001 | Bennett |
| 6,264,198 | B1 | 7/2001 | Stamper |
| 6,302,790 | B1 | 10/2001 | Brossard |
| 6,309,300 | B1 | 10/2001 | Glavich |
| 6,312,334 | B1 | 11/2001 | Yoseloff |
| 6,315,660 | B1 | 11/2001 | DeMar et al. |
| 6,315,664 | B1 | 11/2001 | Baerlocher et al. |
| 6,319,124 | B1 | 11/2001 | Baerlocher et al. |
| 6,322,309 | B1 | 11/2001 | Thomas et al. |
| 6,343,988 | B1 | 2/2002 | Walker et al. |
| 6,346,043 | B1 | 2/2002 | Colin et al. |
| 6,347,996 | B1 | 2/2002 | Gilmore et al. |
| 6,364,766 | B1 | 4/2002 | Anderson et al. |
| 6,364,767 | B1 | 4/2002 | Brossard et al. |
| 6,368,218 | B2 | 4/2002 | Angell, Jr. |
| 6,375,187 | B1 | 4/2002 | Baerlocher et al. |
| 6,398,644 | B1 | 6/2002 | Perrie et al. |
| 6,428,412 | B1 | 8/2002 | Anderson et al. |
| 6,439,995 | B1 | 8/2002 | Hughs-Baird et al. |
| 6,443,837 | B1 | 9/2002 | Jaffe et al. |
| 6,464,582 | B1 | 10/2002 | Baerlocher et al. |
| 6,494,785 | B1 | 12/2002 | Gerrard et al. |
| 6,506,118 | B1 | 1/2003 | Baerlocher et al. |
| 6,514,141 | B1 | 2/2003 | Kaminkow et al. |
| 6,575,830 | B2 | 6/2003 | Baerlocher et al. |
| 6,582,307 | B2 | 6/2003 | Webb |
| 6,599,185 | B1 | 7/2003 | Kaminkow et al. |
| 6,602,137 | B2 | 8/2003 | Kaminkow et al. |
| 6,609,971 | B2 | 8/2003 | Vancura |
| 6,685,561 | B2 | 2/2004 | Anderson et al. |
| 6,796,899 | B2 | 9/2004 | Baerlocher |
| 6,817,944 | B2 | 11/2004 | Kaminkow et al. |
| 2001/0054794 | A1 | 12/2001 | Cole et al. |
| 2002/0025844 | A1 | 2/2002 | Casey et al. |
| 2002/0037764 | A1 | 3/2002 | Anderson et al. |
| 2002/0072402 | A1 | 6/2002 | Baerlocher |
| 2002/0142822 | A1 | 10/2002 | Baerlocher et al. |
| 2002/0155883 | A1 | 10/2002 | Baerlocher |
| 2002/0183109 | A1 | 12/2002 | McGahn et al. |
| 2003/0027623 | A1 | 2/2003 | Rose |
| 2003/0040360 | A1 | 2/2003 | Kaminkow |
| 2003/0045348 | A1 | 3/2003 | Palmer et al. |
| 2003/0045350 | A1 | 3/2003 | Baerlocher et al. |
| 2003/0054875 | A1 * | 3/2003 | Marks et al. ................. 463/20 |
| 2003/0060259 | A1 | 3/2003 | Mierau et al. |
| 2003/0060260 | A1 | 3/2003 | Gerrard et al. |
| 2003/0064795 | A1 | 4/2003 | Baerlocher et al. |
| 2003/0078093 | A1 | 4/2003 | Simms et al. |
| 2003/0078096 | A1 | 4/2003 | Kaminkow et al. |
| 2003/0087693 | A1 | 5/2003 | Baerlocher et al. |
| 2003/0119583 | A1 | 6/2003 | Kaminkow et al. |
| 2003/0157982 | A1 | 8/2003 | Gerrard et al. |
| 2003/0162578 | A1 | 8/2003 | Baerlocher et al. |
| 2003/0162579 | A1 | 8/2003 | Gauselmann |
| 2003/0162584 | A1 | 8/2003 | Hughs-Baird et al. |
| 2003/0195027 | A1 | 10/2003 | Baerlocher et al. |
| 2003/0216165 | A1 * | 11/2003 | Singer et al. ................. 463/20 |

FOREIGN PATENT DOCUMENTS

| | | | |
|---|---|---|---|
| EP | 0874337 | A1 | 10/1998 |
| EP | 0926645 | A2 | 6/1999 |
| EP | 0944030 | A2 | 9/1999 |
| EP | 0945837 | A2 | 9/1999 |
| EP | 0981119 | A2 | 2/2000 |
| EP | 0984408 | A2 | 3/2000 |
| EP | 0984409 | A2 | 3/2000 |
| GB | 2 144 644 | A | 8/1983 |
| GB | 2242300 | | 9/1991 |
| GB | 2 248 403 | A | 4/1992 |
| GB | 2 262 642 | A | 6/1993 |
| WO | WO 97/32285 | | 9/1997 |
| WO | WO 00/12186 | | 3/2000 |
| WO | WO 01/19476 | | 3/2001 |

OTHER PUBLICATIONS

Crazy Fruits Article, written by Atronic, published 2001.

Enchanted Unicorn-Unicorn Bonus Advertisements, written by IGT, published 2001.

Evil Kneivel Advertisement, written by IGT, published 2001.
Five Card Instant Bingo Advertisement, written by IGT, published 2000.
Fortune Cookie Advertisement, written by IGT, published 2000.
Jackpot Party Brochures and Articles, written by WMS Gaming, Inc., published 1998.
Money to Burn Advertisement, written by WMS Garning, Inc., undated.
Piggy Banking and Big Bang Piggy Banking Brochures, written by WMS Gaming, Inc., undated.
Regis Cash Club Advertisement, written by IGT, published 2000.
Texas Tea Advertisement, written by IGT, published 2000.
Top Dollar Brochure, written by IGT, undated.
South Park Advertisement written by IGT, published in 2000.
Stooges II Article written by Strictly Slots, published in Jun. 2001.

* cited by examiner

GAMING DEVICE HAVING AN ACCUMULATING AWARD SYMBOL

PRIORITY CLAIM

This application is a continuation of and claims the benefit of U.S. patent application Ser. No. 10/987,457, filed Nov. 12, 2004, now U.S. Pat. No. 7,056,214, which is a continuation of and claims the benefit of U.S. patent application Ser. No. 10/158,545, filed May 29, 2002, now U.S. Pat. No. 6,958,013, which is a continuation-in-part of and claims the benefit of U.S. patent application Ser. No. 09/963,721, filed Sep. 26, 2001, now U.S. Pat. No. 6,602,137, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates in general to a gaming device having a game, and more particularly to a gaming device having an accumulating award symbol game.

Gaming device manufacturers strive to make gaming devices that provide as much enjoyment and excitement as possible. Providing a game in which a player has an opportunity to win potentially large awards or credits is one way to enhance player enjoyment and excitement.

Currently, gaming machines or devices provide games wherein a player has one or more opportunities to obtain a winning symbol combination on mechanical or video reels. The winning symbol combination may be along the same payline or on different paylines (known as a scatter pay). By providing gaming devices with more winning symbol combinations, players' chances of obtaining an award increase.

One known gaming device is described in U.S. Pat. No. 6,190,254 B1 assigned to Aristocrat Leisure Industries, Pty Ltd. The gaming device in this patent is a slot machine that has a plurality of rotatable reels with symbols. A player spins the reels and receives an award by obtaining predetermined winning symbol combinations on the reels. This gaming device also has a "special" symbol. The special symbol acts like a wildcard symbol such that it combines with an existing symbol combination to provide the most desirable symbol combination to the player. Therefore, the special symbol may represent any symbol in the game that provides the most favorable symbol combination. The special symbol increases the likelihood that a player will obtain an award.

U.S. Pat. No. 6,056,642 assigned to Aristocrat Leisure Industries, discloses a slot machine including several reels which pays an award when a symbol combination having three 7's appears along a payline. If the three 7's occurs on a central payline or "win line," the player receives a jackpot prize. Furthermore, the winning combination of 7's is normally against a clear background. However, the background color can change and affect the award. The background color can be the same color for each symbol or each symbol can be against a different background color. The symbol combinations combined with the color combinations provide several award opportunities for players. The color combinations increase player awards.

Gaming devices that increase the opportunities to obtain awards and increase the size of the awards are desirable. Players are attracted to games that provide several larger awards. Therefore, to increase player enjoyment and excitement, it is desirable to provide new games for gaming devices.

SUMMARY OF THE INVENTION

The present invention provides a gaming device and in particular a game of a gaming device that enables players to spin several reels to obtain an award symbol called an activator symbol. A player spins reels on a gaming device attempting to obtain one or more activator symbols on the reels. If a player obtains an activator symbol, the player receives an award for the activator symbol plus the awards for the symbols that are adjacent to the activator symbol on the reels. Therefore, the location of the activator symbol or symbols on the reels in part determines the player's award. The player continues to spin the reels until there are no spins remaining.

In one embodiment, a gaming device has several reels with various symbols on the reels. One or more of the symbols is an activator symbol. The symbols including the activator symbol may be any suitable desired symbol, shape or character. A player receives a number of spins to start a game that is based on the credits wagered by the player. The player spins the reels attempting to obtain one or more activator symbols. The player receives an award for each activator symbol that appears on the reels. In one embodiment, the activator symbols do not have to appear on any particular payline for a player to receive an award. Furthermore, the player receives the awards associated with each symbol that is adjacent to each activator symbol on the reels. The player continues to spin the reels until the player does not have any spins remaining in the game. Once the game ends, the player receives the total accumulated awards for the game.

In one embodiment, a player is provided with an award for each activator symbol and each symbol that is adjacent to each activator symbol. The awards include, but are not limited to, bonus values, credits, modifiers and free spins. The player's total award is based on the sum of the activator symbol awards and the adjacent symbol awards. It should be appreciated that the processor or controller of the gaming device could randomly determine the awards for the symbols. In accordance with one aspect of the invention, the awards are associated with the probabilities such that one award has a greater probability of being assigned to a symbol than another award.

In another embodiment of the present invention, the player receives awards for symbols in a predetermined relationship to an activator symbol. A player receives awards for symbols that are adjacent and symbols that are not adjacent to an activator symbol. For example, the player obtains awards for the activator symbol and the symbols that are above or below the activator symbol, but not the symbols that are on the sides of the activator symbol. Thus, the awards associated with an activator symbol vary.

In yet another embodiment of the present invention, each reel has an award associated with it. The player starts the game with a number of spins and spins the reels attempting to obtain an activator symbol. If the player obtains an activator symbol or symbols, the player receives an award for each "activated" activator symbol and the activated activator symbol is highlighted or distinguished in a suitable manner. In one aspect of this embodiment, if an activator symbol is activated, the player receives the award associated with the reel that includes the activated activator symbol. In another aspect of this embodiment, each payline is associated with a multiplier. It should be appreciated that reels and paylines may be associated with bonus values, credits, free spins, multiplier's or any other type of award. If a player obtains an activator symbol, the player receives an award equal to the reel award multiplied by the payline multiplier associated with the location of the activator symbol.

In a further embodiment of the present invention, the activator symbol modifies an existing award in a game. In this embodiment, the player has a number of spins to start a game and must obtain a winning symbol combination on a particular payline. If the player obtains a winning symbol combination, the player receives an award. The player also obtains an additional award if there is an activated activator symbol on the reels. If there is an activated activator symbol on the reels, the player's award for the winning combination is multiplied by a multiplier or other modifier associated with the payline that includes the activator symbol. The multiplier or modifier may also be independent of the payline or independent from the reels. It should also be appreciated that the multiplier or modifier may be or be related to or based on the number of paylines wagered on or played by the player.

It is therefore an advantage of the present invention to provide a gaming device having at least one activator symbol where a player receives additional awards for obtaining the activator symbol or symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
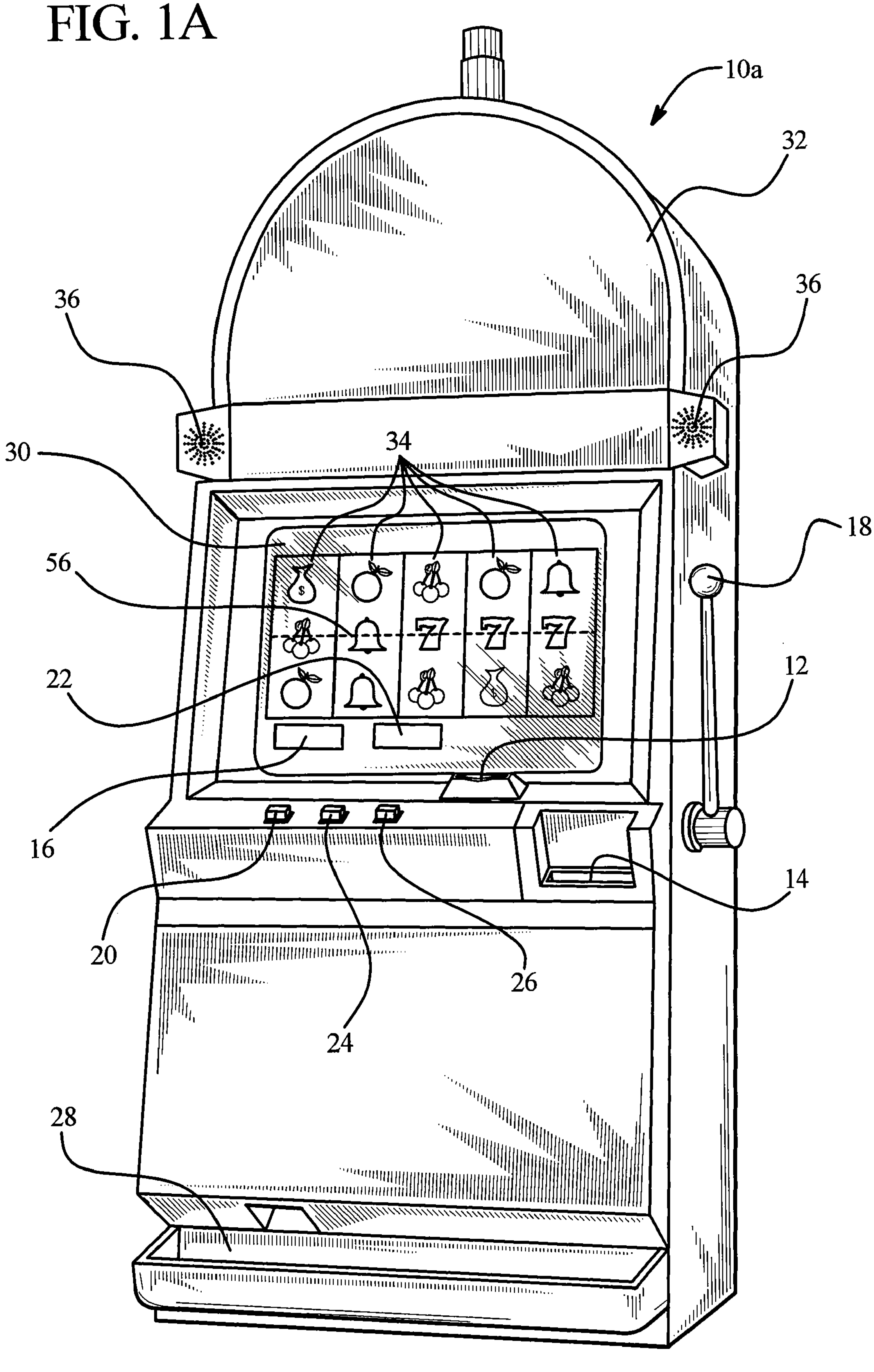
FIG. 1A is front perspective view of one embodiment of the gaming device of the present invention.
Figure 1B:
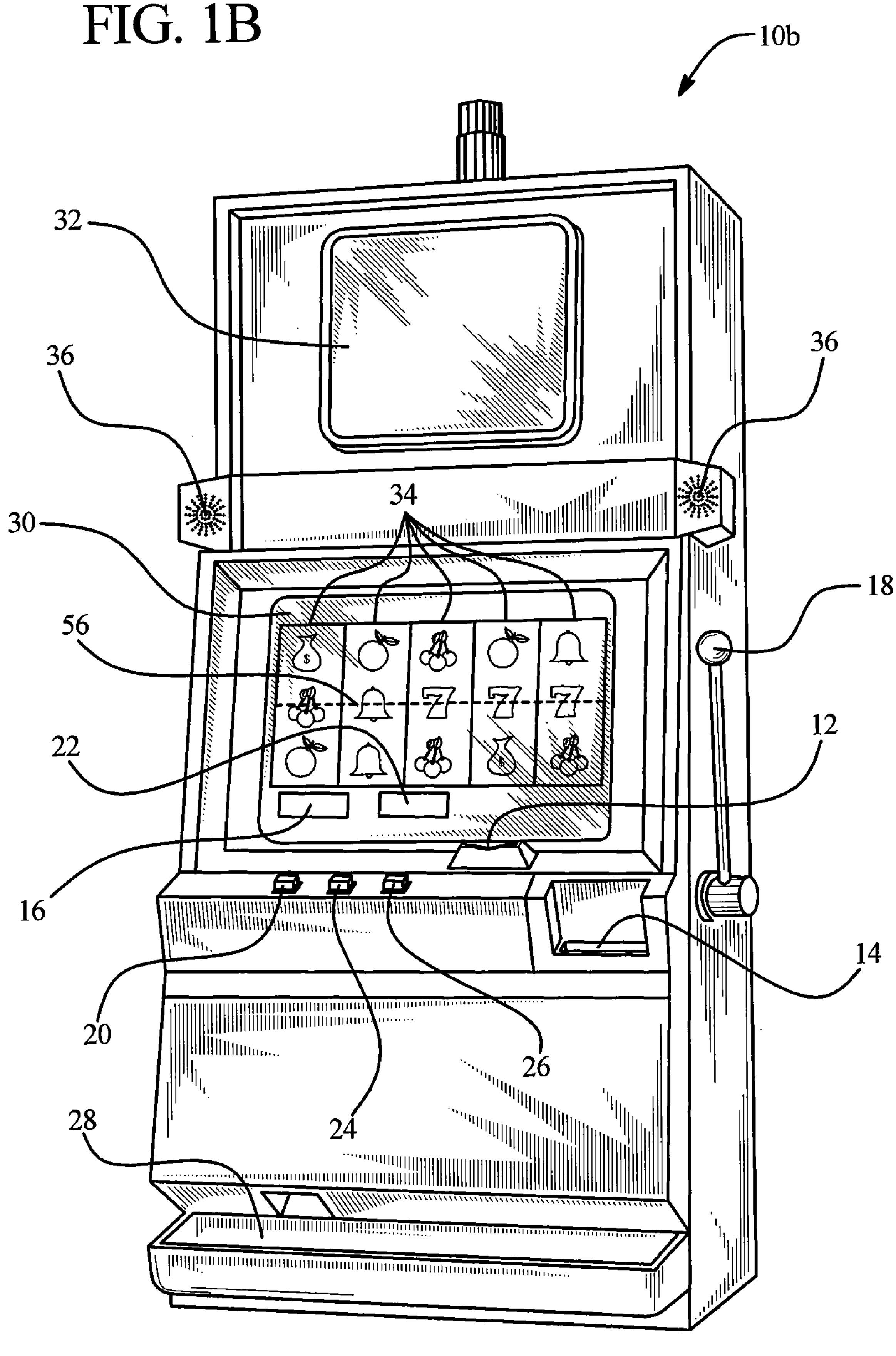
FIG. 1B is front perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can also incorporate any bonus triggering event and any of the bonus games. The symbols and indicia used on and in gaming device 10 may be in mechanical, electrical, electronic or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator symbol used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. Other wager indicators such as a bet max button may be employed in the gaming device of the present invention.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 displays a plurality of reels 34 such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
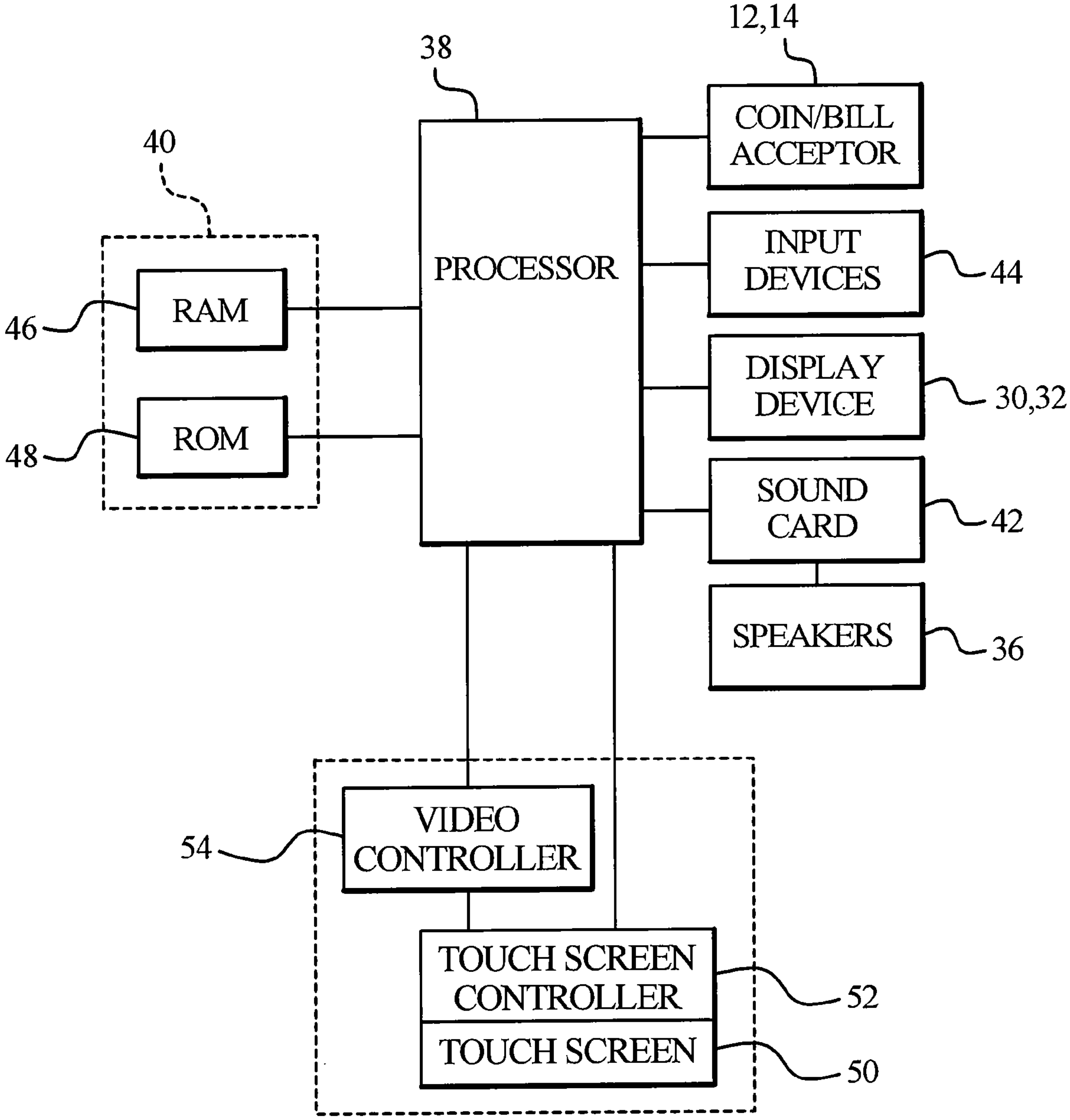
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively or individually referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, gaming device 10 may also give players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 may use a video-based central display device 30 to enable the player to play the bonus round. The qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Operation of the Gaming Device

Figure 3A:
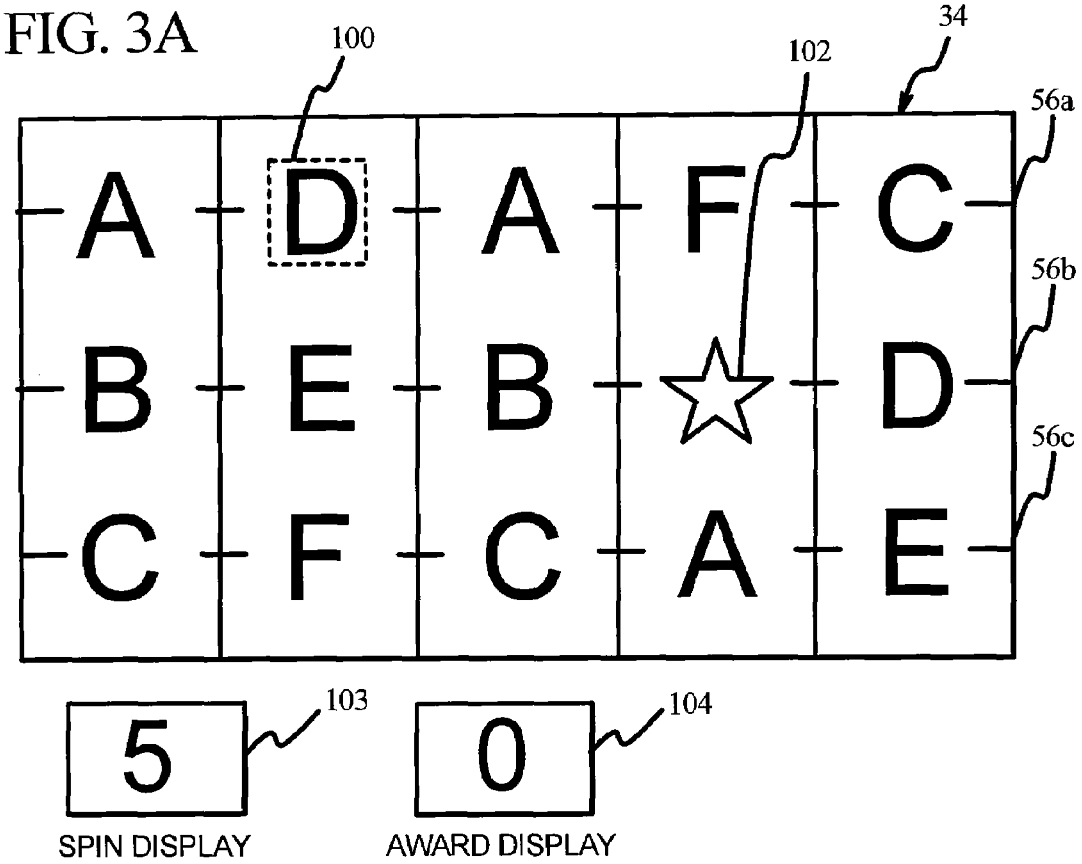
FIG. 3A is an enlarged front elevational view of one of the display devices of FIGS. 1A and 1B, which illustrates one embodiment of the present invention.
Figure 3B:
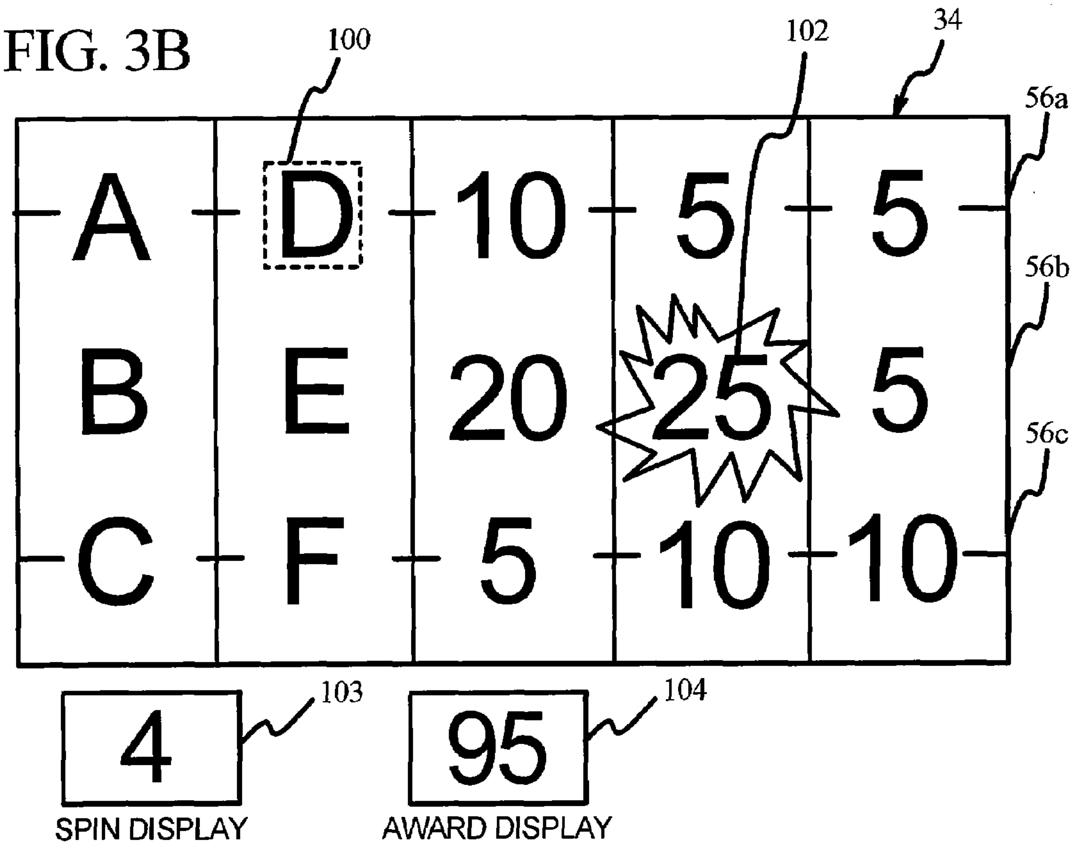
FIG. 3B is an enlarged front elevational view of the embodiment shown in FIG. 3A illustrating a spin by a player that includes an activator symbol.

Referring to FIGS. 3A and 3B, one embodiment of the display device 30 or 32 of the present invention is illustrated. The display device 30 or 32 includes a plurality of reels 34 having several symbols 100 on the reels. In FIG. 3A the symbols are letters. The symbols, however, may be any symbols or characters as desired by the game implementor. The symbols 100 include at least one and preferably a plurality of activator symbols 102. One activator symbol is represented by a star symbol in this example. The activator symbol, however, may be any symbol desired by the game implementor. Furthermore, the gaming device includes a plurality of paylines 56*a*, 56*b* and 56*c*. In one embodiment, a winning combination of symbols must appear on a specific payline. In another embodiment, the winning combination may be on several paylines, which is known as a scatter pay symbol combination.

The game also has two displays, a spin display 103 and an award display 104. The spin display 103 indicates the number of spins remaining in a game. The number of spins may vary in each game and may be a predetermined or randomly determined by the gaming device. The award display 104 displays the total accumulated award during the game. It should be appreciated that the number of spins or activations may be one or more spins or activations.

In FIG. 3A, the game begins with an award total of zero as indicated by award display 104. In some games, a player may start out with an award total from a previous game or games. Also, the player has five spins in this example game as indicated by spin display 103. To start the game, the gaming device or player spins the reels 34. Once the reels stop spinning, the gaming device determines if the player obtained an activator symbol. In this illustration the player obtained one activator symbol 102 on the central payline 56*b*. Initially, each symbol is associated with a masked award. The activator symbol activates the symbols and reveals the award associated with that symbol.

FIG. 3B illustrates how the activator symbol operates in the game. The activator symbol 102 reveals an award of twenty-five. The player receives this award plus the adjacent awards. The activator symbol activates the adjacent symbols and reveals the awards associated with those symbols. The adjacent awards total seventy and this award total is added to the activator symbol award to achieve a total award of ninety-five for that spin as indicated by award display 104. The spin display 103 indicates that the player only has four spins remaining in the game.

Figure 4A:
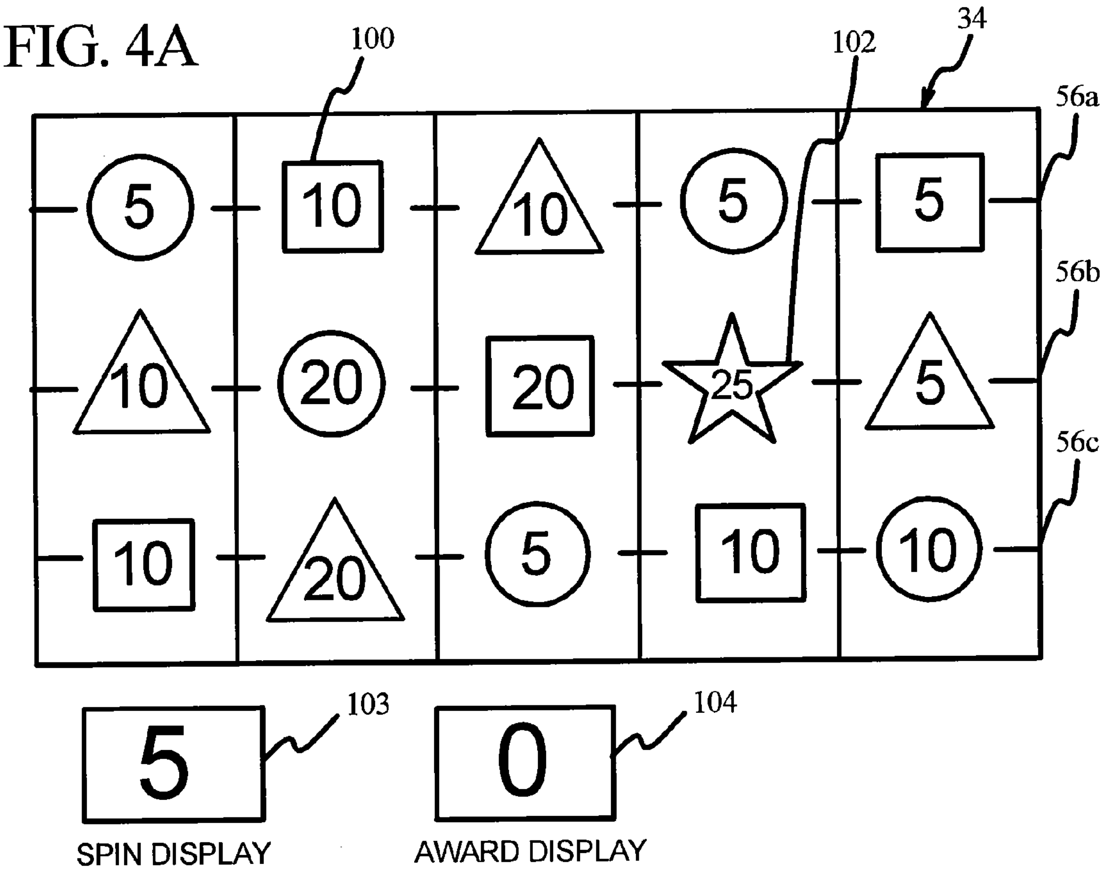
FIG. 4A is an enlarged front elevational view of one of the display devices of FIGS. 1A and 1B, which illustrates another embodiment of the present invention.
Figure 4B:
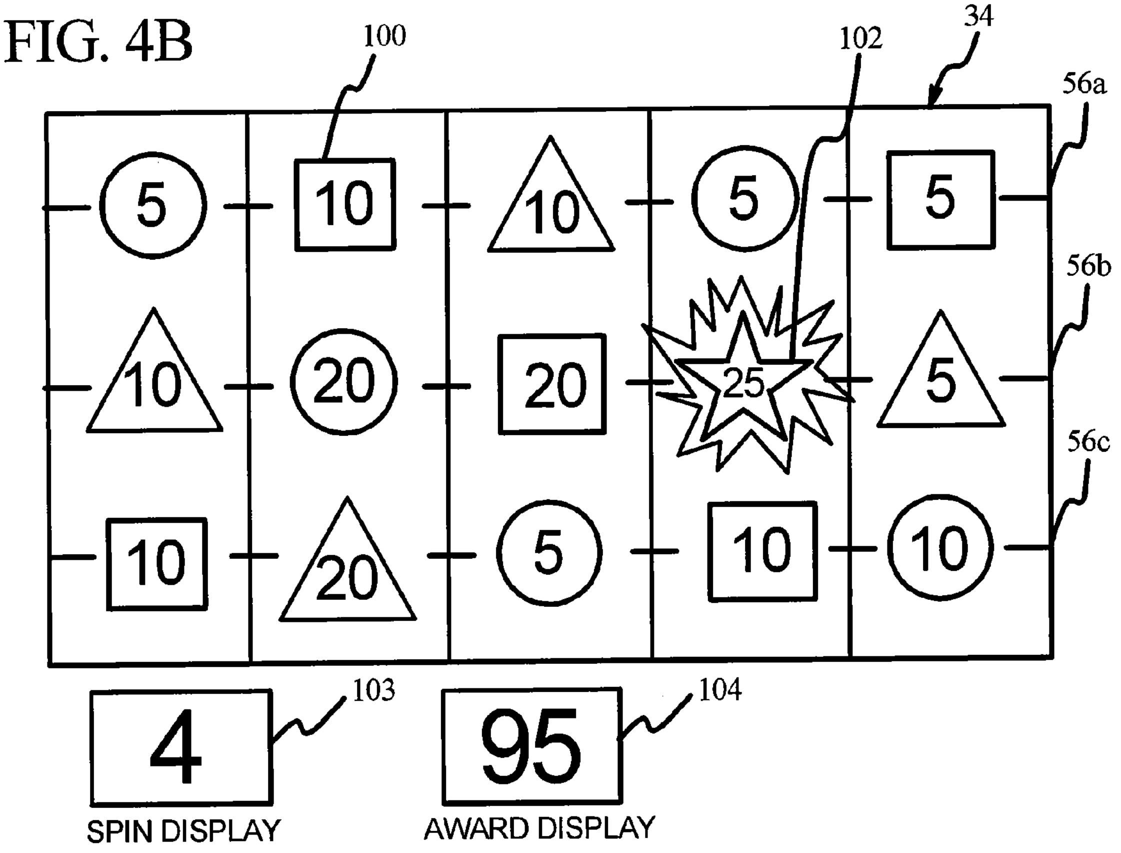
FIG. 4B is an enlarged front elevational view of the embodiment shown in FIG. 4A illustrating a spin by a player that includes an activator symbol.

Referring now to FIGS. 4A and 4B, another embodiment of the present invention is illustrated where the symbols are shapes and the awards associated with those symbols are displayed on the symbols. The symbols are designated as circles, squares and triangles. Each shape has an award displayed on the shape itself. The spin display 103 displays the number of spins remaining in the game. The award display 104 displays the total award for the game. In this illustration, the player starts the game with five spins as indicated by spin display 103 and an award value of zero as indicted by the award display 104.

In FIG. 4B, the player spins the reels and obtains an activator symbol 102 on payline 56*b* of the reels. The activator symbol has an award of twenty-five and activates the adjacent symbols on the reels. The adjacent symbols provide the awards associated with those symbols. The total award for the adjacent symbols is seventy. This award is added to the activator symbols award to achieve a total award of ninety five for this spin. The award total is indicated by the award display 104. Also, the spin display shows that the player only has four spins remaining in the game.

Figure 5A:
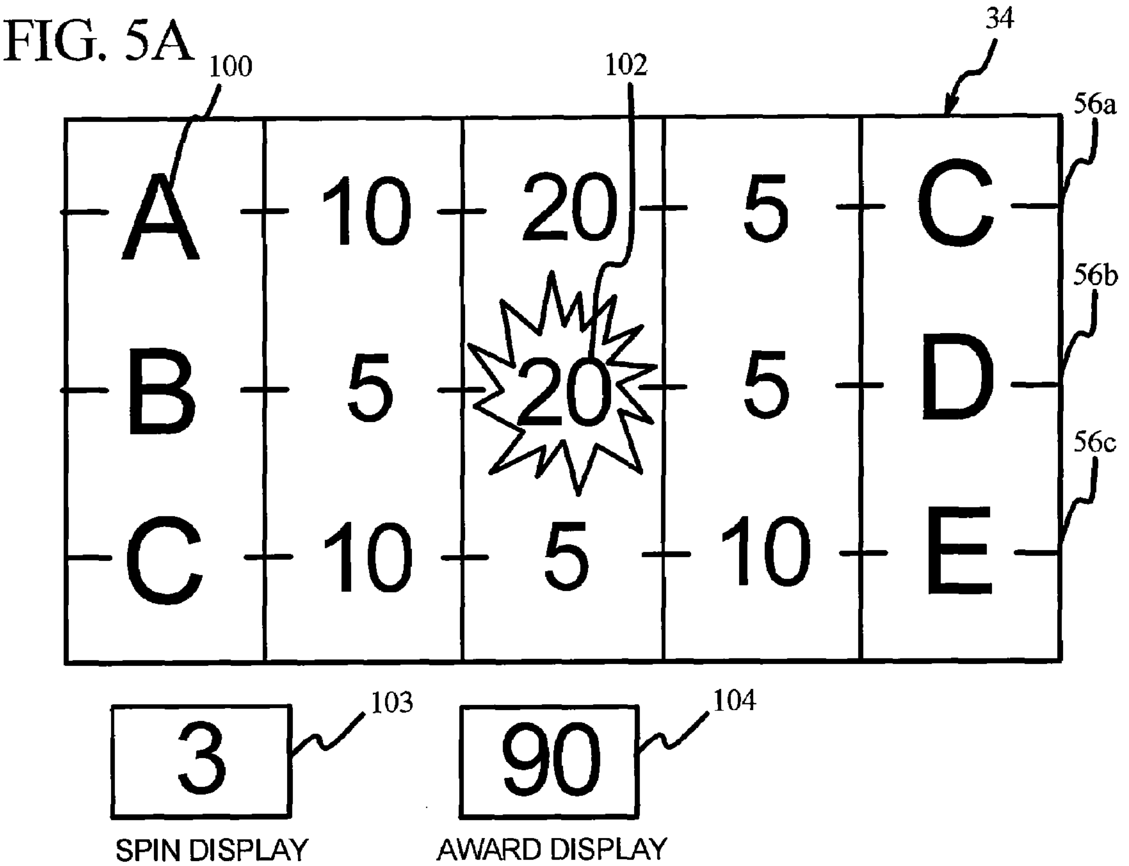
FIGS. 5A through 5D are enlarged front elevational views of the embodiment shown in FIG. 3A illustrating a game where the player has four spins of the reels.

Referring now to FIGS. 5A to 5D, an illustration of the embodiment described in FIGS. 3A and 3B above is shown where the symbols are letters having masked awards. In this example, the player starts the game with four spins and an award total of zero. In FIG. 5A, the gaming device or player spins the reels 34 and obtains an activator symbol 102 on the payline 56*b*. The activator symbol reveals an award of twenty. Also, the activator symbol activates the adjacent symbols and the adjacent symbols reveal the awards associated with those symbols. The total award for the adjacent symbols equals seventy. This award is added to the activator symbol award to achieve a total award for the spin of ninety as indicated by the award display 104. The player only has three spins remaining in the game as indicated by spin display 103.

Figure 5B:
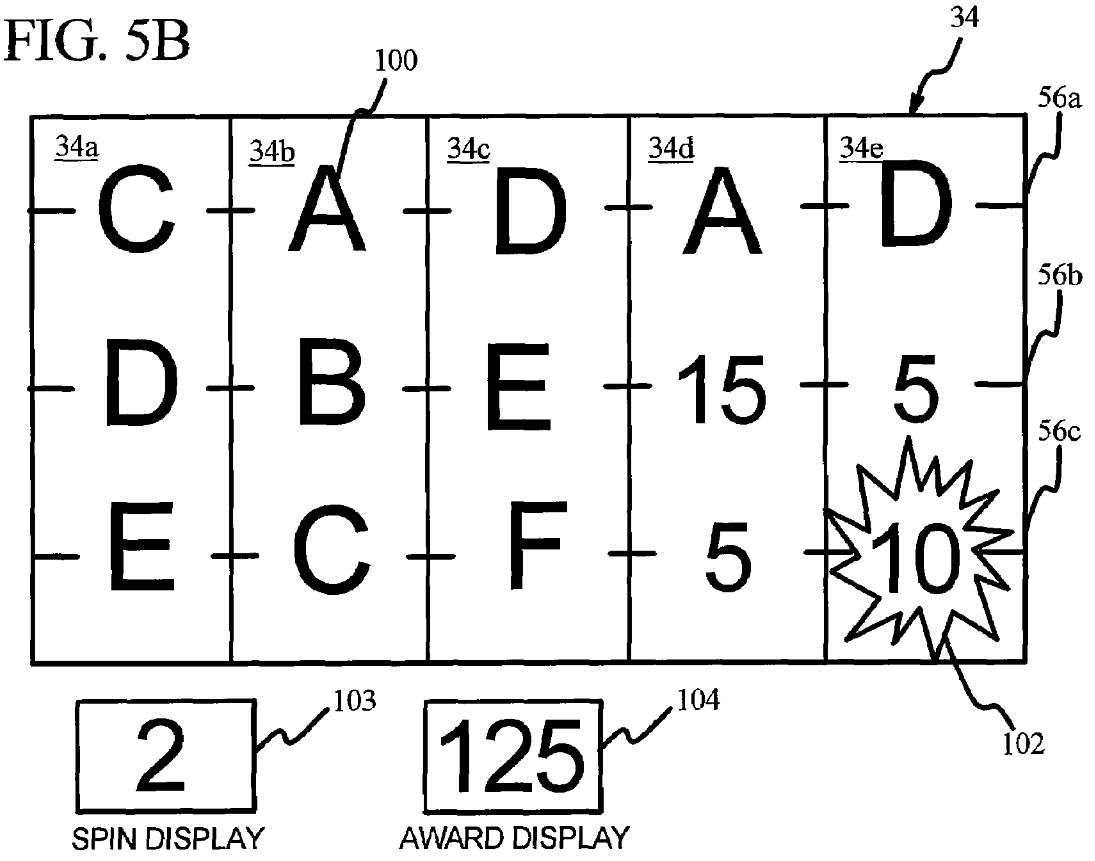

In FIG. 5B, the player spins the reels for the second time. Once the reels stop spinning, the player obtains another activator symbol 102. This time the activator symbol 102 is located on reel 34*e* along payline 56*c*. The activator symbol reveals an award of ten, which is provided to the player. The player also receives the total accumulated award for the symbols adjacent to the activator symbol 102. Because the activator symbol is in a corner of the reels, there are only three adjacent symbols to the activator symbol. The activator symbol activates the adjacent symbols. The adjacent symbols reveal the awards associated with these symbols. The total award for the adjacent symbols, twenty-five, is added to the activator symbol award of ten to achieve a total award for this spin of thirty-five. This award total is added to the award from the previous spin to give the player a total award of one hundred twenty-five as indicated by the award display 104. The spin display 103 indicates that the player has two spins remaining in the game.

Figure 5C:
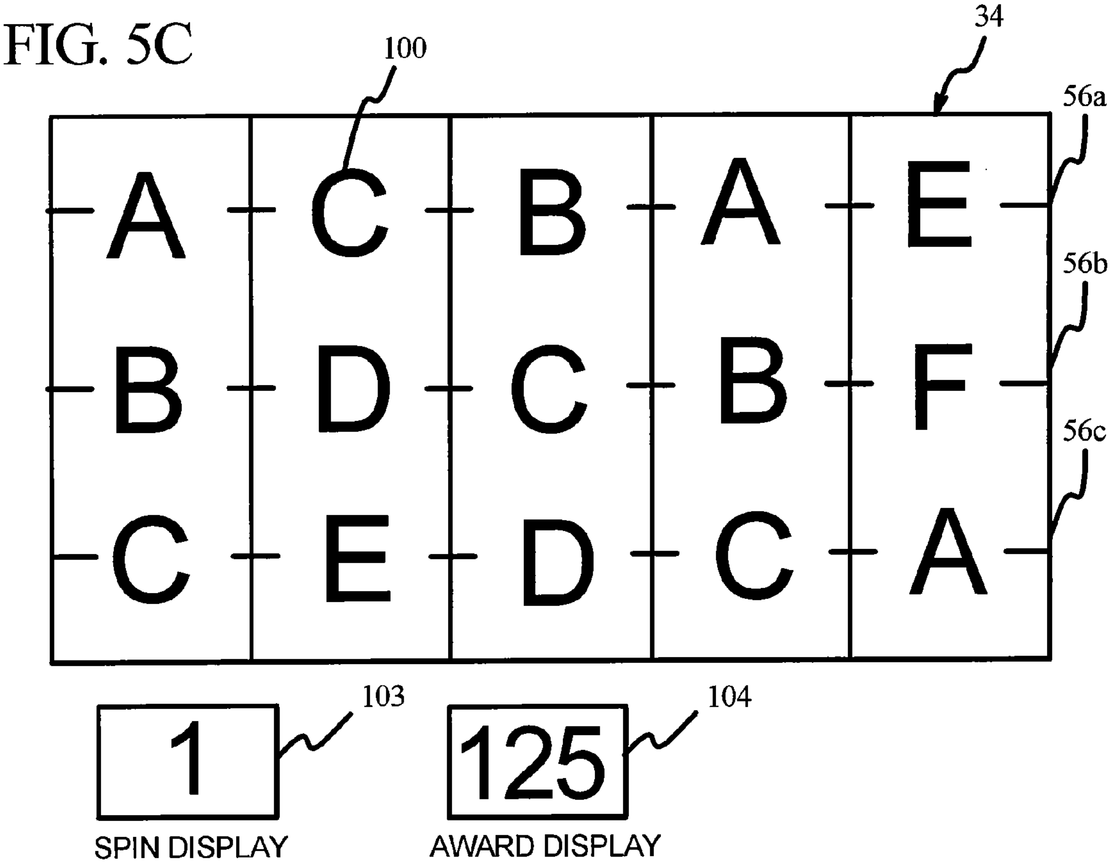

In FIG. 5C, the player spins the reels again and does not obtain an activator symbol 102. Therefore, the player does not receive an award for this spin assuming no other winning combination of symbols occurs on the reels. It should be appreciated that the awards associated with the activators are above and beyond any awards associated with symbols or symbol combinations which appear on the reels. The player's total award of one hundred twenty-five remains unchanged as displayed in award display 104. The player now has only one spin remaining in the game as indicated by spin display 103.

Figure 5D:
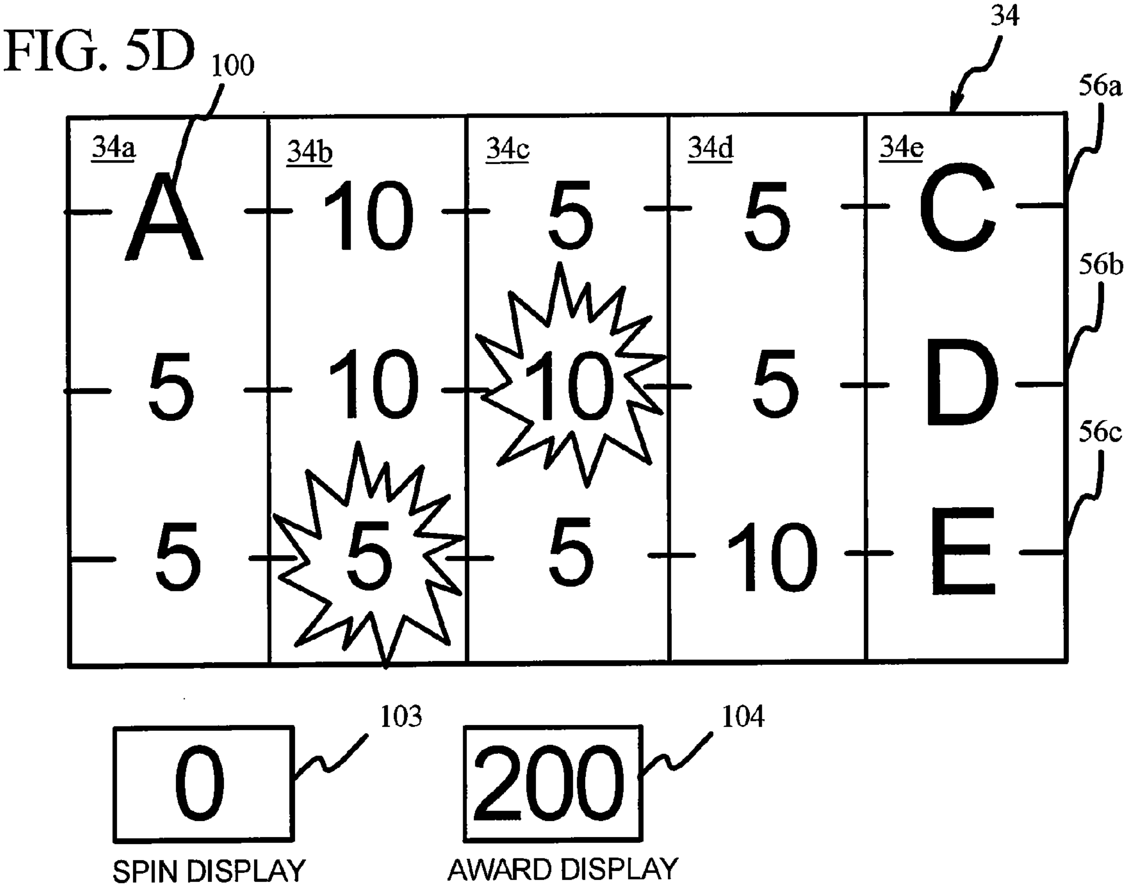

Referring to FIG. 5D, the player spins the reels for the last time in this game. The player obtains an activator symbol 102 on reel 34*c* along payline 56*b*. The activator symbol reveals an award of ten. Also, the activator symbol activates the symbols that are adjacent to it. The adjacent symbols then reveal the associated awards. One symbol reveals another activator symbol on reel 34*b* along payline 56*c*. Thus, the activator symbols may be symbols, awards or both symbol and awards in a game. Activator symbols that are awards function in the same way as activator symbols that are symbols on the reels 34. In this example, the player receives the award associated with the activator symbol, ten, plus the awards associated with the adjacent symbols, which equals sixty. The player also receives the award associated with the activator symbol award and the awards associated with symbols that are adjacent to that activator symbol. Thus, the player receives an additional award of fifteen to achieve a total award for that spin of seventy-five. The total award for the game is two hundred as indicated by award display 104. The spin display 103 indicates that there are no spins remaining in the game and therefore, the player receives the total award for the game of two hundred. This example illustrates how the activator symbol can substantially increase a player's award in a game and elevate the player's level of excitement and enjoyment of the game.

In a further alternative embodiment, the processor could provide to player all the awards associated with each activator symbol. For instance, in the above example, of FIG. 5D, the processor could provide the first part of the award which is 65 for the first activator symbol and the second part of the award which is 40 for the second activator symbol. Thus, each activator symbol and the awards associated with common associated, related or adjacent symbols is counted twice. It should further be appreciated that one or more of the symbols including the activator symbol could be paid more than once, modified or multiplied.

Figure 6A:
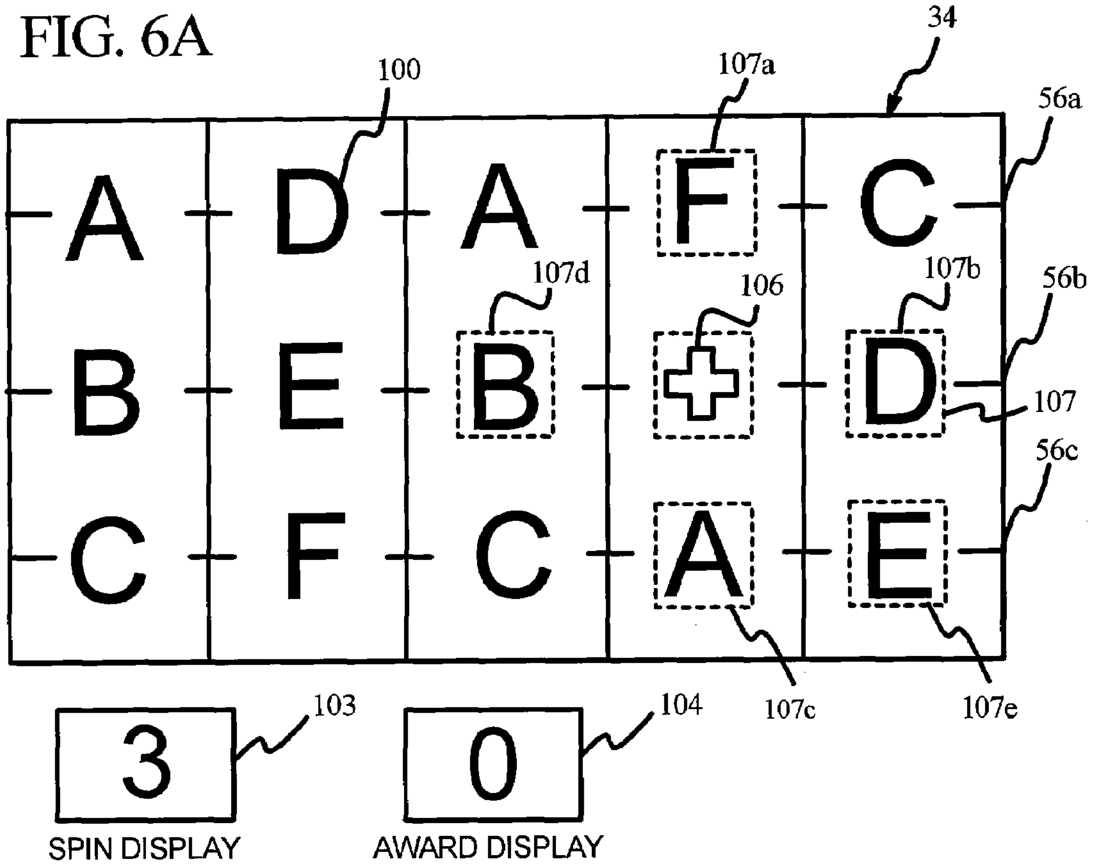
FIG. 6A is an enlarged front elevational view of one of the display devices of FIGS. 1A and 1B illustrating another embodiment of the present invention where the activator symbol is a shape.
Figure 6B:
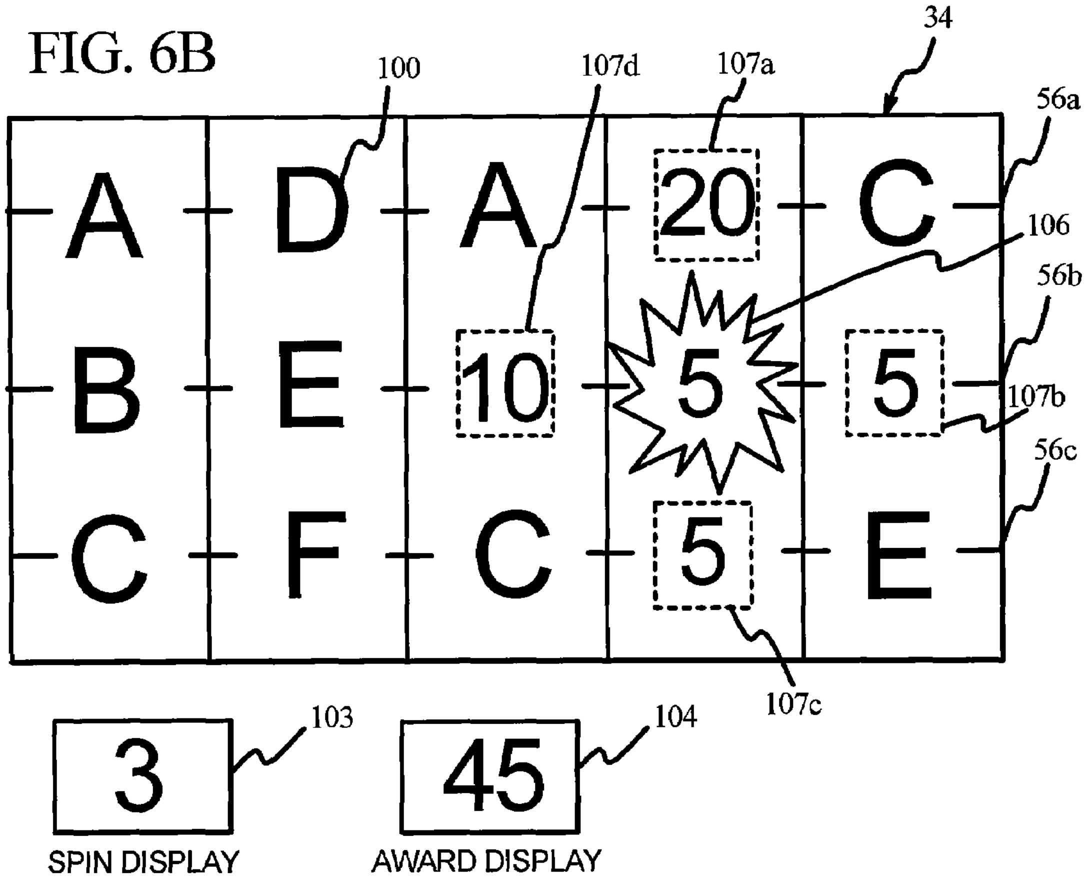
FIG. 6B is an enlarged front elevational view illustrating the embodiment of FIG. 6A where the activator symbol activates symbols corresponding to the activator symbol shape in FIG. 6A.

Referring now to FIGS. 6A and 6B, a further embodiment of the present invention is illustrated where the reels 34 include symbols represented by letters and a special activator symbol. In FIG. 6A, the activator symbol 106 represents a shape such as the plus sign in this illustration. The shape designated by the activator symbol 106 determines the player's award for that spin.

For example, the plus sign-shaped activator symbol in this illustration provides an accumulated award to the player. The accumulated award includes the award associated with the activator symbol 106 plus the awards associated with the symbols 107*a*, 107*b*, 107*c* and 107*d*. Therefore, the shape of the activator symbol 106 determines which awards will be revealed by the activator symbol. In this illustration, the activator symbol is a plus sign so the symbols that form a plus sign shape about the activator symbol are revealed. If the activator symbol was L-shaped, the symbols 107A, 107C and 107E would be revealed.

FIG. 6B shows that the player receives the award associated with the activator symbol 106 and the awards associated with symbols 107*a*, 107*b*, 107*c* and 107*d*. Adding up these awards gives the player a total award of forty-five for this spin as indicated by award display 104.

It should thus be appreciated that the location of the activator symbol on the reels and specifically the row and column location of the activator symbol may, in accordance with the present invention, determine the accumulated award. In this regard, the location of the activator symbol on the reels determines how may other symbols are adjacent to the activator symbol. For instance, if the activator symbol is in a corner, there are two adjacent or related symbols. It should further be appreciated that specific locations could have designated related symbols. For instance, a corner symbol could be related to the other corner symbols, or a symbol in a row could be related to all of the other symbols in the row. Thus, the location of the activator symbol could at least in part determine the number of different related symbols (and the awards associated with such symbols) which are included in the accumulated award.

Figure 7A:
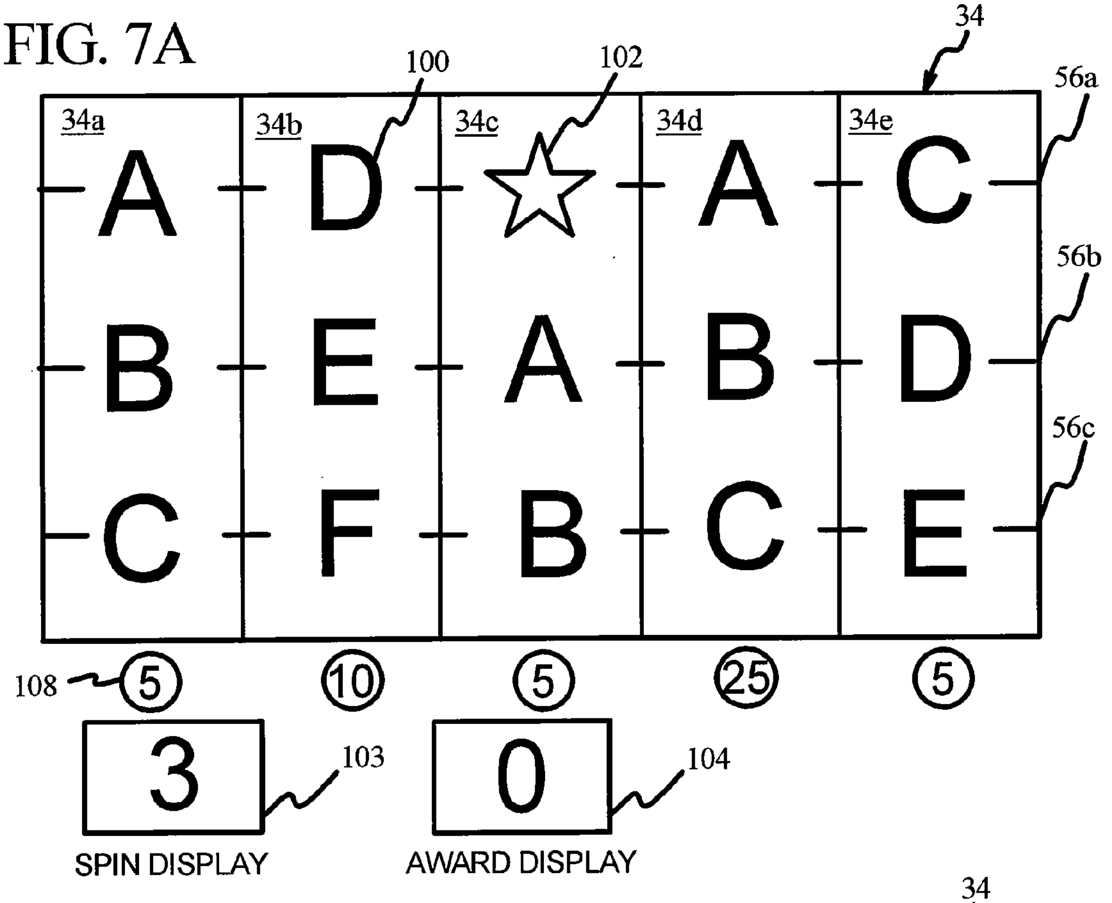
FIGS. 7A through 7D are enlarged front elevational views of one of the display devices of FIGS. 1A and 1B illustrating an example of another embodiment of the present invention where the activator symbol location provides an award associated with the reels.
Figure 7B:
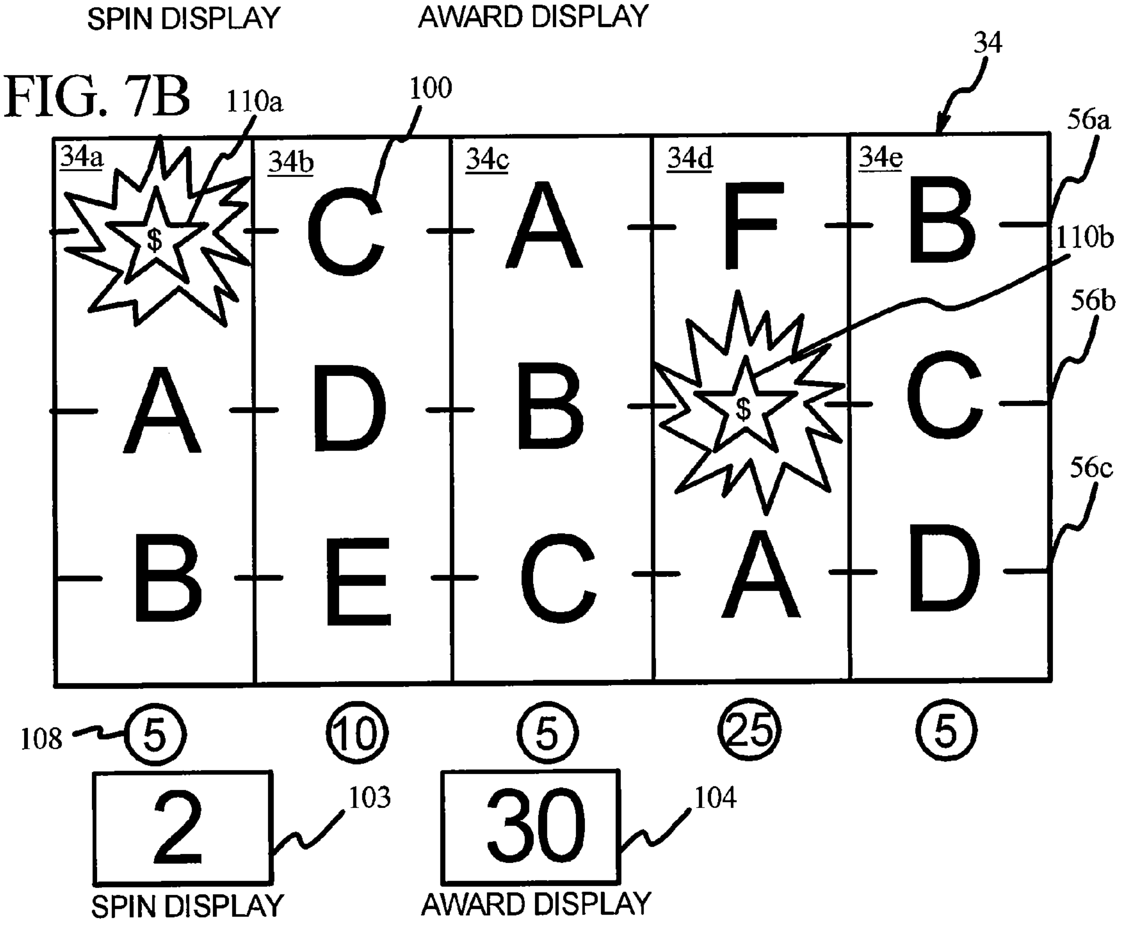

Referring now to FIGS. 7A and 7B, another embodiment of the present invention is illustrated where the award is based on where the activator symbol is located on the reels 34. In FIG. 7A, the symbols on the reels are designated as letters. Also, one or more activator symbols 102, represented by stars in this illustration, are located on the reels 34*a* to 34*e*. Furthermore, an award 108 is associated with each reel. Awards of five, ten, five, twenty-five and five are associated with reels 34*a*, 34*b*, 34*c*, 34*d* and 34*e*, respectively. Although this illustration shows the awards as bonus values, the awards can be credits, free spins, multipliers or any other award desired by the game implementor. If an activator symbol appears on a particular reel, the player receives the award associated with that reel only if the activator symbol is activated. In this illustration, an activated activator symbol is represented by a star with a dollar sign on it (not shown). If the player does not obtain an activated activator symbol, the player does not receive an award for that spin. The player starts the game with three spins and an award value of zero as indicated by spin display 103 and award display 104.

Referring to 7B, a player spins the reels 34. After spinning the reels, the player obtains two activator symbols 110 and 110*b*. One activator symbol 110*a* is located on the first reel 34*a* and the other activator symbol 110*b* is located on reel 34*d*. In this illustration, both activator symbols are activated as indicated by the dollar sign on each activator symbol. Thus, the player receives the award 108 associated with reels 34*a* and 34*d*. The award associated with reel 34*a* is five and the award associated with 34*d* is twenty-five. The total award for this spin is thirty as indicated by award display 104. The player has two spins remaining in the game as indicated by spin display 103.

Figure 7C:
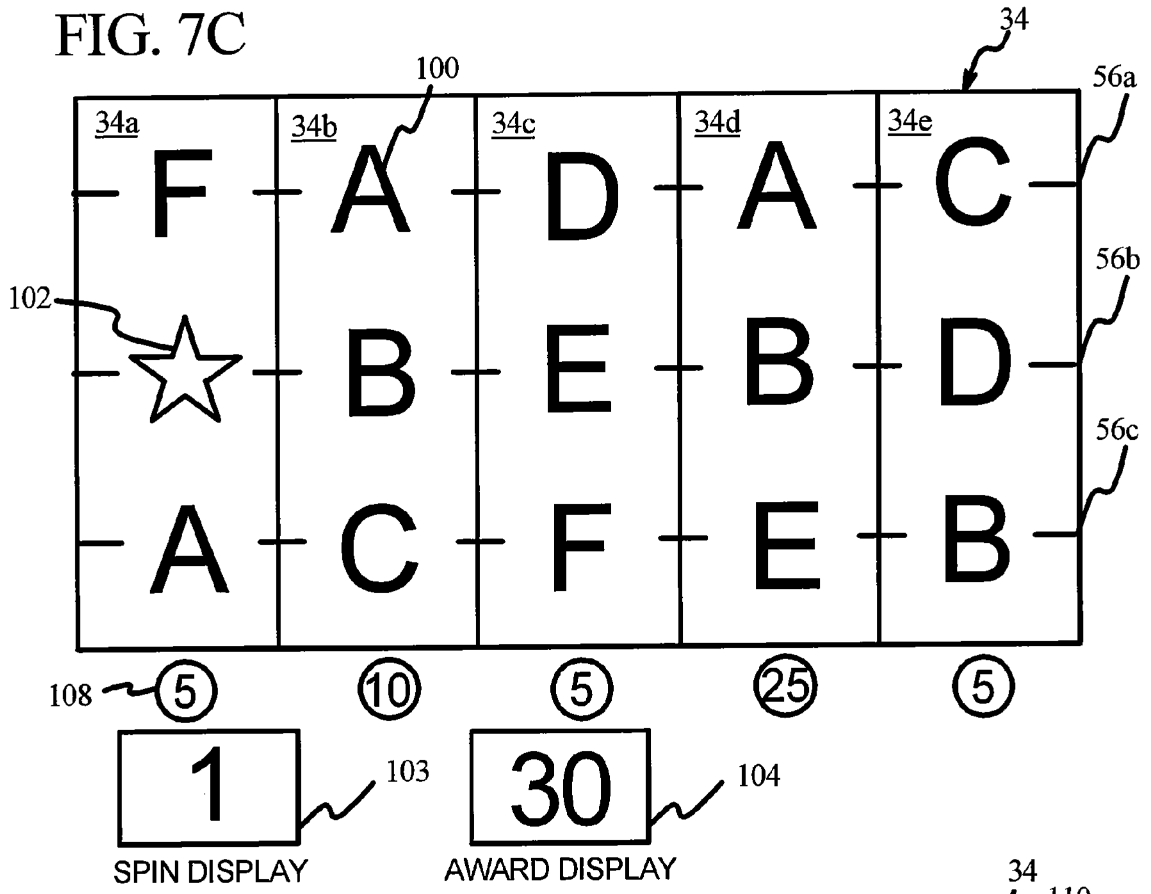

Referring to FIG. 7C, the player spins the reels 34 and obtains an activator symbol 102 on reel 34*a*. The activator symbol 102 is not activated (as shown by the lack of a dollar sign on the symbol) and the player does not receive an award for this spin. The player's award remains unchanged as indicated by award display 104. The player has only one spin remaining in the game as indicated by spin display 103.

Figure 7D:
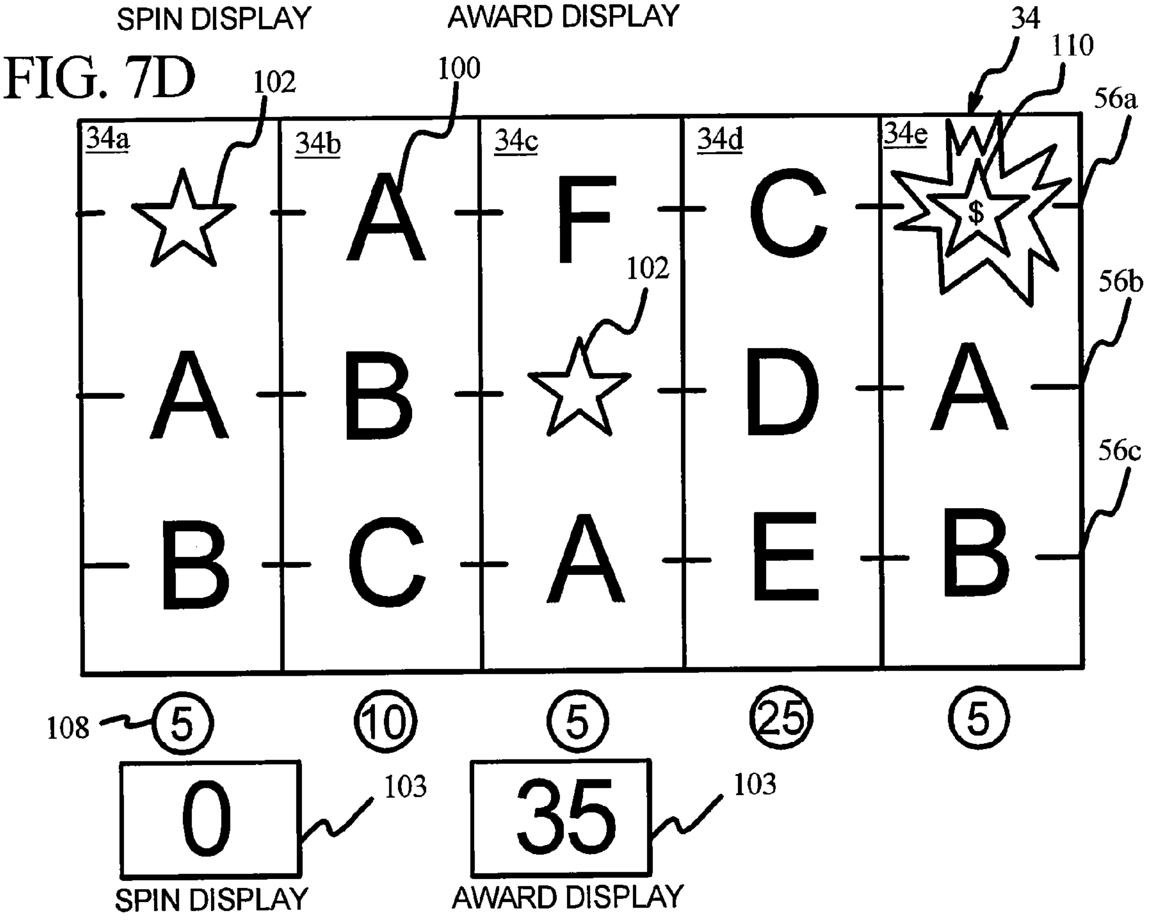

In FIG. 7D, the player spins the reels for the last time in this game. After the reels stop spinning, the player obtains three activator symbols on the reels 34. Only one activator symbol, however, is activated. The activator symbols 102 on reels 34*a* and 34*c* are not activated. The activator symbol 110 on reel 34*e* is activated as shown by the dollar sign on the symbol. The player, therefore, receives the award for reel 34*e*, which is five. The player's total award for the game is thirty-five as indicated by award display 104. Because the player does not have any spins remaining as indicated by spin display 103, the game ends and the player receives a total award of thirty-five.

Figure 8A:
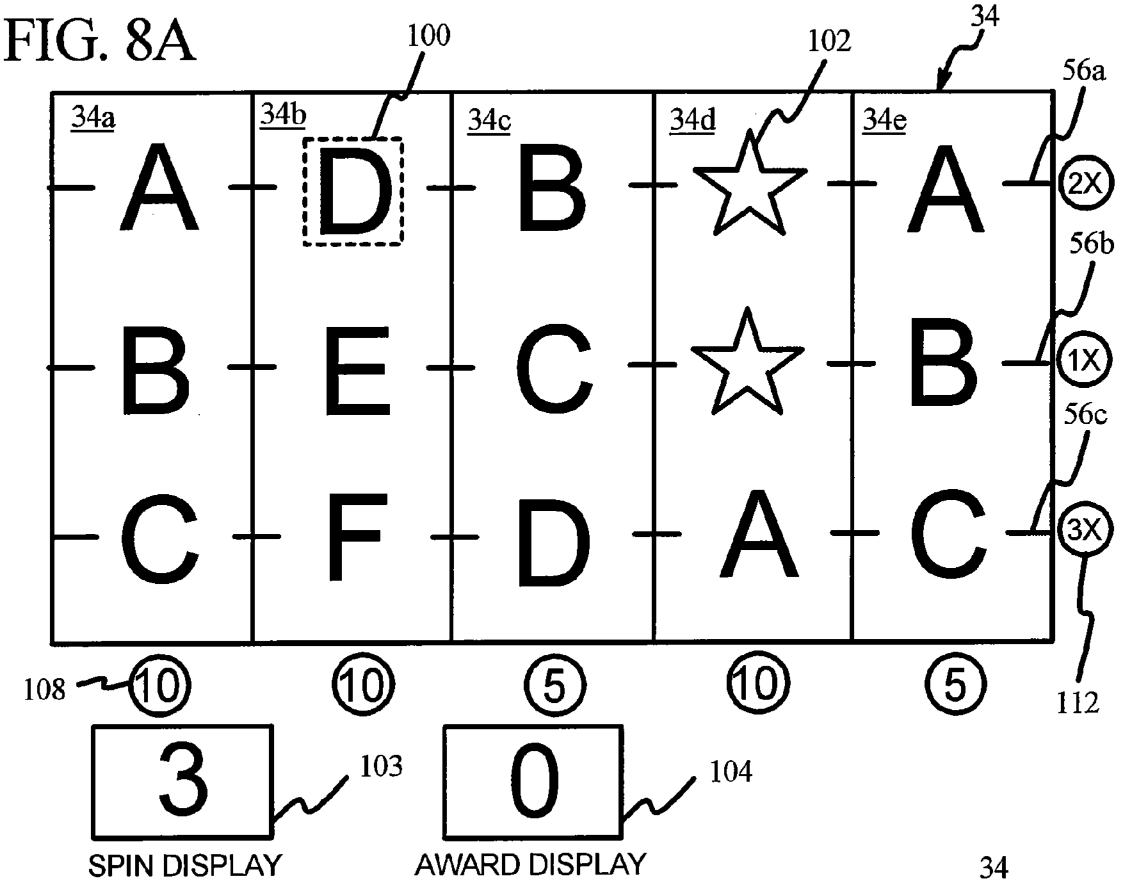
FIGS. 8A and 8B are enlarged front elevational views of the present invention illustrating an embodiment where the activator symbol location determines an award associated with the reels and paylines.
Figure 8B:
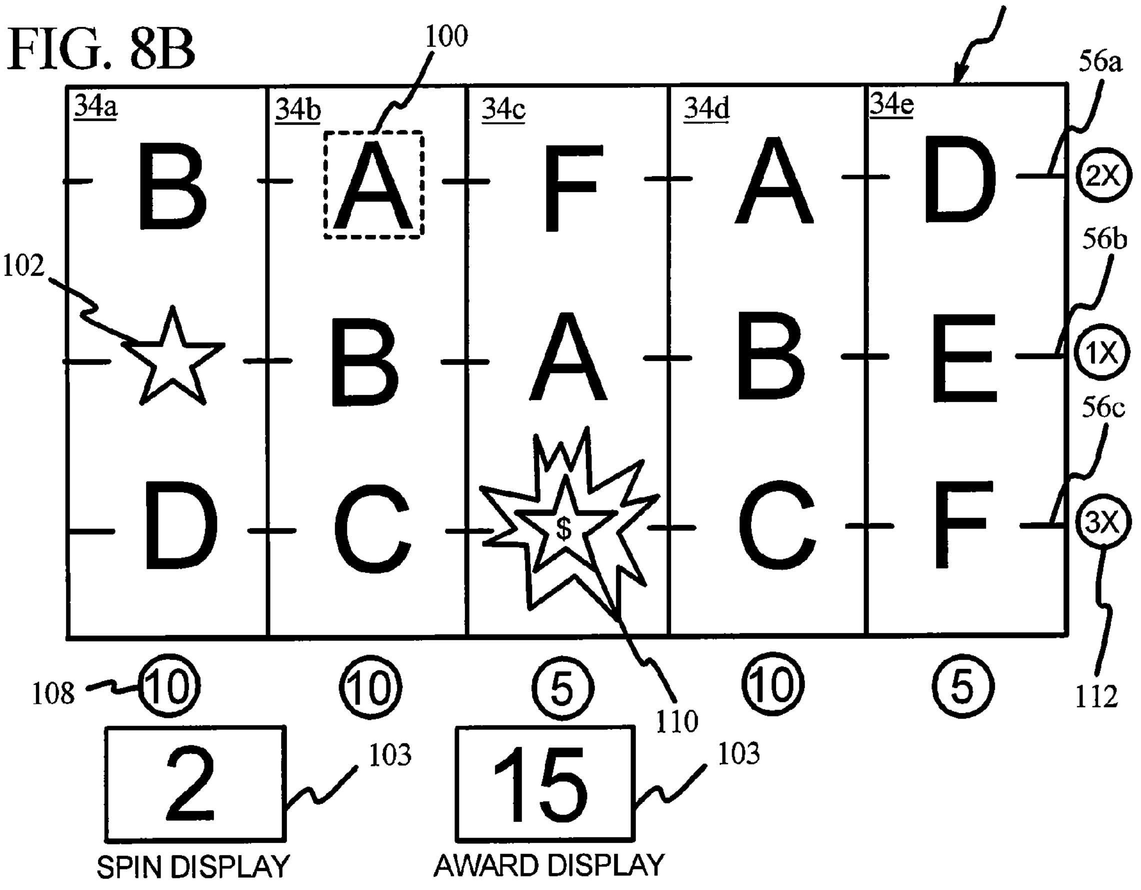

Referring now to FIGS. 8A and 8B, a further embodiment of the present invention is illustrated where both the reels 34 and the paylines 56*a*, 56*b* and 56*c* are associated with awards 108. In FIG. 8A, the reels 34*a* to 34*e* are each associated with a bonus value 108. The reels 34*a*, 34*b*, 34*c*, 34*d* and 34*e* are associated with bonus values ten, ten, five, ten and five respectively. The paylines 56 are associated with multipliers 112. Each payline 56*a*, 56*b* and 56*c* is associated with a multiplier "2×," "1×" and "3×," respectively. A player receives an award when the player obtains an activated activator symbol on the reels. An activator symbol 102 is represented by a star and an activated activator symbol is represented by a star with a dollar sign on it in this illustration. The activated activator symbol, however, may be represented by any symbol desired by the game implementor. If an activated symbol 102 appears on a particular reel 34 and payline 56, the player receives the award associated with that reel and payline. The award equals the bonus value associated with the particular reel 34 multiplied by the multiplier on the particular payline 56. The multiplied award is the award that the player receives for that spin. If there is more than one activator symbol on the reels, the player receives the sum of the individual multiplied awards for those activated symbols 110.

In FIG. 8B, the player spins the reels and obtains an activated activator symbol on reel 34*c* along payline 56*c*. The award 108 associated with reel 34*c* is five and the award 112 associated with payline 56*c* is "3×." The player's award is the reel award of five multiplied by the payline award of "3×," which is fifteen. The award of fifteen is added to the player's total award of zero to achieve a total award for the game of fifteen as indicated by award display 104. It should be appreciated that the reels 34 and the paylines 56 may be associated with any type of award as desired by the game implementor.

Figure 9A:
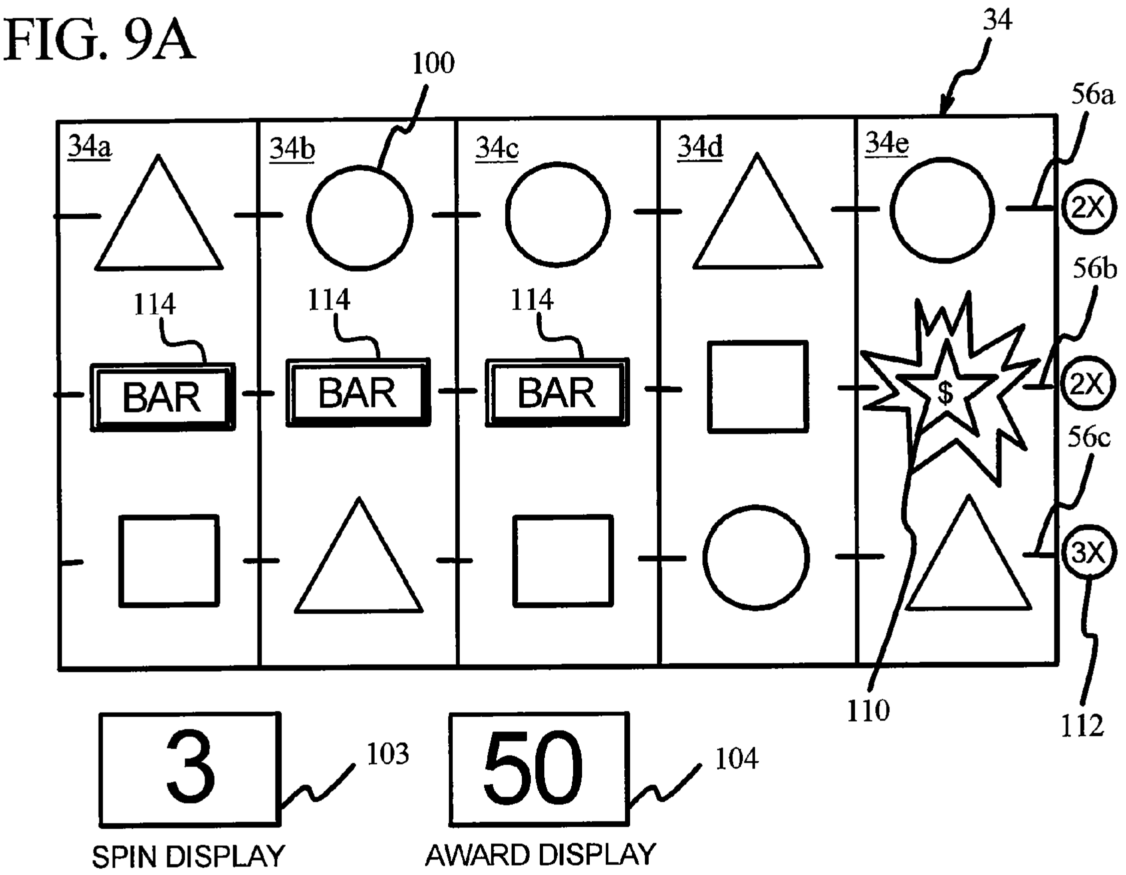
FIGS. 9A and 9B are enlarged from elevational views of the present invention illustrating another embodiment where the activator symbol location modifies an award from a winning symbol combination.
Figure 9B:
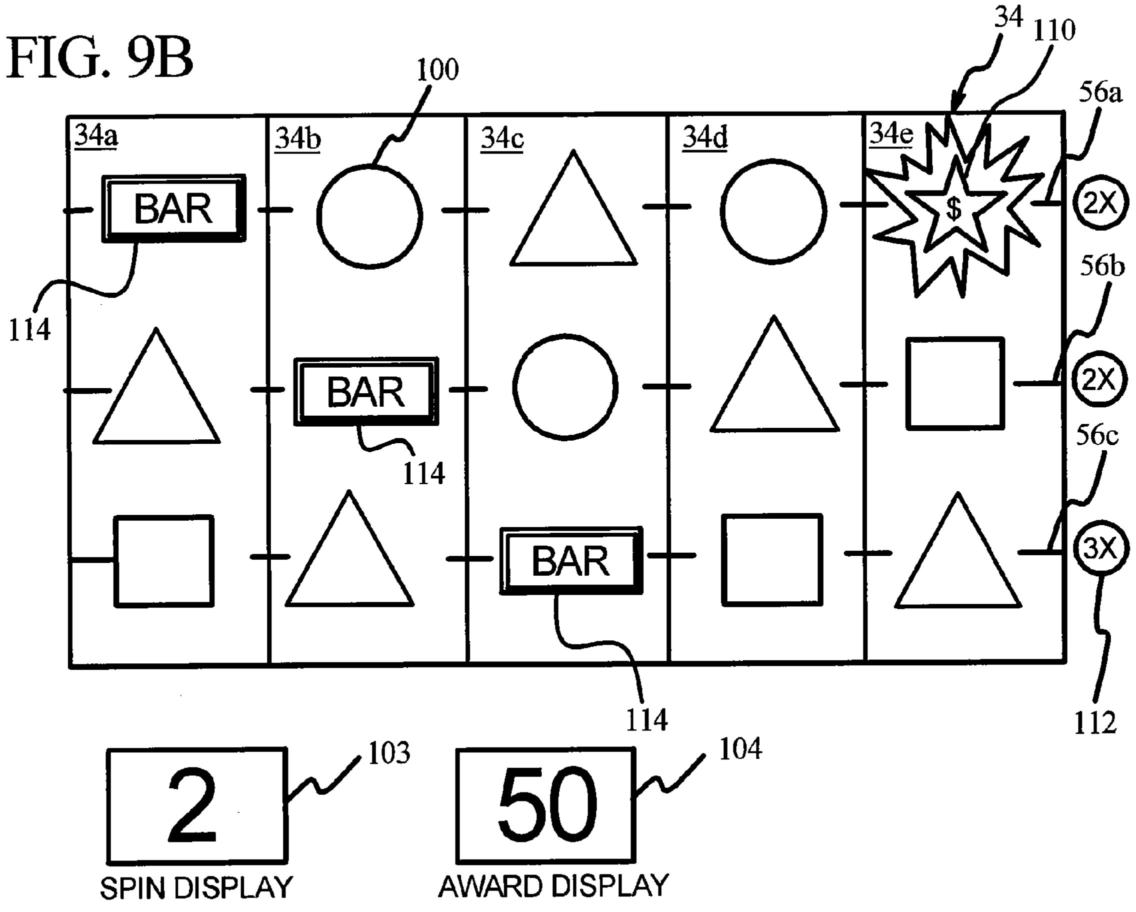

Referring now to FIGS. 9A and 9B, one example of the present invention is illustrated where the award is based on winning symbol combinations and activator symbols. In FIG. 9A, a winning symbol combination includes three bar symbols 114. Also, in one embodiment each payline is associated with an award, which in this example is a multiplier. The paylines may be associated with any type of award. Also, it should be appreciated that the reels 34, paylines 56*a*, 56*b* and 56*c* or both reels and paylines may be associated with awards. In this example, the paylines 56*a*, 56*b* and 56*c* are associated with multipliers "2×," "2×" and "3×" respectively. After spinning the reels 34 the player obtains three bar symbols 114 on payline 56*b*. It should be appreciated that the winning combination can appear on any payline 56 desired by the game implementor. Therefore, the player receives an award for obtaining the winning combination, which in this example is twenty-five. The player also receives an additional award because the player obtained an activated activator symbol 110 on the reels 34. It should be appreciated that the activated symbol 110 can appear on a particular payline or reel or on any payline or reel as desired by the game implementor. The player's award for the winning combination is multiplied by the multiplier associated with the payline location of the activated symbol. In this example, the award, twenty-five, is multiplied by the multiplier, "2×," to achieve a total award for the spin of fifty as indicated by the award display 104.

FIG. 9B illustrates a further example of the present invention described in FIG. 9A where the winning combination may be a scatter pay combination. A scatter pay combination is a combination that can be on any payline 56. Therefore, the player spins the reels in FIG. 9B and obtains a scatter pay combination. The scatter pay combination is shown by having three bar symbols 114 on different paylines 56. In this illustration, the player receives an award for the winning combination of twenty-five. The player also obtained an activated activator symbol on reel 34*e* and payline 56*a*. The award associated with that payline is a multiplier "2×." The multiplier is multiplied by the winning combination award, twenty-five, to achieve a total award of fifty for this spin.

It should also be appreciated that the awards or multipliers may be independent of the paylines or reels and randomly selected or determined and applied to any award when an activator symbol is activated.

In an alternative embodiment of the present invention, the random generation or occurrence of two or more activator symbols on the reels causes one or a plurality of such activator symbols to be activated.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device operable under control of a processor, said gaming device comprising:

a game controlled by the processor;

a plurality of reels in the game;

a plurality of symbols on the reels, said symbols including at least one designated symbol;

a plurality of winning combinations of said symbols;

a plurality of losing combinations of said symbols;

a plurality of awards associated with the plurality of winning combinations of said symbols;

a plurality of modifiers associated with the game, wherein at least two of the modifiers are different;

a plurality of paylines associated with the plurality of reels, wherein a plurality of said paylines are each individually associated with at least one of said modifiers; and a display device operable to display said game;

wherein said processor is programmed to operate with the display device to control a play of the game by:

(a) enabling a player to place at least one payline wager amount on each of one or more of the paylines;

(b) generating a plurality of the symbols on the reels;

(c) determining if said generated symbols form one of the winning combinations of said symbols;

(d) determining if the designated symbol was generated on one of said paylines;

(e) if the generated symbols form one of the winning combinations of said symbols and the designated symbol was not generated on one of said paylines, providing the player the award associated with the formed winning combination of said symbols; and (f) if the generated symbols form one of the winning combinations of said symbols and the designated symbol was generated on one of said paylines:

(i) modifying the award associated with the formed winning combination of said symbols with the modifier associated with the payline which the designated symbol was generated on, and (ii) providing the player the modified award.

2. The gaming device of claim 1, wherein the plurality of awards are selected from the group consisting of values, credits, multipliers and free spins.

3. The gaming device of claim 1, wherein the designated symbol is an activator symbol.

4. The gaming device of claim 1, wherein each of said paylines is individually associated with at least one of modifiers.

5. The gaming device of claim 1, wherein at least one of said paylines is associated with a plurality of said modifiers.

6. The gaming device of claim 1, wherein a plurality of said paylines are each associated with a plurality of said modifiers.

7. The gaming device of claim 1, wherein the processor is operable to control the play of the game by providing the player the modified award if the designated symbol was generated on one of said wagered on paylines.

8. The gaming device of claim 1, wherein the processor is operable to control the play of the game by providing the player one of the awards if the symbols generated along one of said wagered on paylines form one of the winning combinations of said symbols.

9. The gaming device of claim 1, wherein each of the modifiers are different.

10. The gaming device of claim 1, wherein said modifiers are multipliers.

11. The gaming device of claim 1, wherein at least one of said modifiers is based on the number of paylines wagered on.

12. A gaming device operable under control of a processor, said gaming device comprising:

a game controlled by the processor;

a plurality of reels in the game;

a plurality of symbols on the reels, said symbols including at least one designated symbol;

a plurality of winning combinations of said symbols;

a plurality of losing combinations of said symbols;

a plurality of awards associated with the plurality of winning combinations of said symbols;

a plurality of modifiers associated with the game, wherein at least two of the modifiers are different;

a plurality of paylines associated with the plurality of reels, wherein a plurality of said paylines are each individually associated with at least one of said modifiers; and a display device operable to display said game;

wherein said processor is programmed to operate with the display device to control a play of the game by:

(a) enabling a player to place at least one payline wager amount on each of one or more of the paylines;

(b) generating a plurality of the symbols on the reels;

(c) determining if said symbols generated along one of said wagered on paylines form one of the winning combinations of said symbols;

(d) determining if the designated symbol was generated on one of said paylines;

(e) if the symbols generated along one of said wagered on paylines form one of the winning combinations of said symbols and the designated symbol was not generated on one of said paylines, providing the player the award associated with the formed winning combination of said symbols; and (f) if the symbols generated along one of said wagered on paylines form one of the winning combinations of said symbols and the designated symbol was generated on one of said paylines:

(i) modifying the award associated with the formed winning combination of said symbols with the modifier associated with the payline which the designated symbol was generated on, and (ii) providing the player the modified award.

13. The gaming device of claim 12, wherein the plurality of awards are selected from the group consisting of values, credits, multipliers and free spins.

14. The gaming device of claim 12, wherein the designated symbol is an activator symbol.

15. The gaming device of claim 12, wherein the processor is operable to control the play of the game by providing the player the modified award if the designated symbol was generated on one of said wagered on paylines.

16. The gaming device of claim 12, wherein each of the modifiers are different.

17. The gaming device of claim 12, wherein said modifiers are multipliers.

18. A gaming device operable under control of a processor, said gaming device comprising:

a plurality of symbols on a plurality of reels, wherein upon at least one wager placed on at least one of a plurality of paylines, a plurality of the symbols are generated;

a first modifier associated with a first of said paylines, wherein if the generated symbols form one of a plurality of winning symbol combinations and a designated symbol is generated on the first of said paylines, said processor modifies any award associated with the generated winning symbol combination by the first modifier and provides said modified award to a player;

a different second modifier associated with a second of said paylines, wherein if the generated symbols form one of the plurality of winning symbol combinations and the designated symbol is generated on the second of said paylines, said processor modifies any award associated with the generated winning symbol combination by the second modifier and provides said modified award to the player; and a display device operable with said processor to display said symbols, said first modifier and said second modifier.

19. The gaming device of claim 18, wherein the awards are selected from the group consisting of values, credits, multipliers and free spins.

20. The gaming device of claim 18, wherein the designated symbol is an activator symbol.

21. A method of operating a gaming device, said method comprising:

(a) enabling a player to place at least one payline wager amount on each of one or more of a plurality of paylines, wherein a plurality of said paylines are each individually associated with at least one of a plurality of modifiers and at least two of the modifiers are different;

(b) generating a plurality symbols;

(c) determining if said generated symbols form one of a plurality of winning symbol combinations or one of a plurality of losing symbol combinations, wherein a plurality of awards are associated with the plurality of winning symbol combinations;

(d) determining if a designated symbol was generated on one of said paylines;

(e) if the generated symbols form one of the winning symbol combinations and the designated symbol was not generated on one of said paylines, providing the player the award associated with the formed winning symbol combination; and (f) if the generated symbols form one of the winning symbol combinations and the designated symbol was generated on one of said paylines:

(i) modifying the award associated with the formed winning symbol combination with the modifier associated with the payline which the designated symbol was generated on, and (ii) providing the player the modified award.

22. The method of claim 21, wherein the plurality of awards are selected from the group consisting of values, credits, multipliers and free spins.

23. The method of claim 21, wherein the designated symbol is an activator symbol.

24. The method of claim 21, wherein each of said paylines is individually associated with at least one of modifiers.

25. The method of claim 21, wherein at least one of said paylines is associated with a plurality of said modifiers.

26. The method of claim 21, wherein a plurality of said paylines are each associated with a plurality of said modifiers.

27. The method of claim 21, which includes providing the player the modified award if the designated symbol was generated on one of said wagered on paylines.

28. The method of claim 21, which includes providing the player one of the awards if the symbols generated along one of said wagered on paylines form one of the winning symbol combinations.

29. The method of claim 21, wherein each of the modifiers are different.

30. The method of claim 21, wherein said modifiers are multipliers.

31. The method of claim 21, wherein at least one of said modifiers is based on the number of paylines wagered on.

32. The method of claim 21, which is provided through a data network.

33. The method of claim 32, wherein the data network is an internet.

34. A method of operating a gaming device, said method comprising:

(a) enabling a player to place at least one payline wager amount on each of one or more of a plurality of paylines, wherein a plurality of said paylines are each individually associated with at least one of a plurality of modifiers and at least two of the modifiers are different;

(b) generating a plurality symbols;

(c) determining if said symbols generated along one of said wagered on paylines form one of a plurality of winning symbol combinations or one of a plurality of losing symbol combinations, wherein a plurality of awards are associated with the plurality of winning symbol combinations;

(d) determining if a designated symbol was generated on one of said paylines;

(e) if the symbols generated along one of said wagered on paylines form one of the winning symbol combinations and the designated symbol was not generated on one of said paylines, providing the player the award associated with the formed winning symbol combination; and (f) if the symbols generated along one of said wagered on paylines form one of the winning symbol combinations and the designated symbol was generated on one of said paylines:

(i) modifying the award associated with the formed winning symbol combination with the modifier associated with the payline which the designated symbol was generated on, and (ii) providing the player the modified award.

35. The method of claim 34, wherein the plurality of awards are selected from the group consisting of values, credits, multipliers and free spins.

36. The method of claim 34, wherein the designated symbol is an activator symbol.

37. The method of claim 34, which includes providing the player the modified award if the designated symbol was generated on one of said wagered on paylines.

38. The method of claim 34, wherein each of the modifiers are different.

39. The method of claim 34, wherein said modifiers are multipliers.

40. The method of claim 34, which is provided through a data network.

41. The method of claim 40, wherein the data network is an internet.

42. A method of operating a gaming device, said method comprising:

(a) enabling a player to place at least one payline wager amount on each of a plurality of paylines;

(b) generating a plurality of symbols;

(c) if the generated symbols form one of a plurality of winning symbol combinations and a designated symbol is generated on a first of said paylines:

(i) modifying any award associated with the generated winning symbol combination by a first modifier associated with said first of said paylines, and (ii) providing the player said modified award; and (d) if the generated symbols form one of the plurality of winning symbol combinations and the designated symbol is generated on a second of said paylines:

(i) modifying any award associated with the generated winning symbol combination by a second modifier associated with said second of said paylines, and (ii) providing the player said modified award.

43. The method of claim 42, wherein the plurality of awards are selected from the group consisting of values, credits, multipliers and free spins.

44. The method of claim 42, wherein the designated symbol is an activator symbol.

45. The method of claim 42, which is provided through a data network.

46. The method of claim 45, wherein the data network is an internet.

47. A memory device which includes a plurality of instructions, that when executed by at least one processor, cause a gaming machine to:

(a) enable a player to place at least one payline wager amount on each of one or more of a plurality of paylines, wherein a plurality of said paylines are each individually associated with at least one of a plurality of modifiers and at least two of said modifiers are different;

(b) generate a plurality symbols on a plurality of reels;

(c) determine if said generated symbols form one of a plurality of winning symbol combinations, wherein a plurality of awards are associated with the plurality of winning symbol combinations;

(d) determine if a designated symbol was generated on one of said paylines;

(e) if the generated symbols form one of the winning symbol combinations and the designated symbol was not generated on one of said paylines, provide the player the award associated with the formed winning symbol combination; and (f) if the generated symbols form one of the winning symbol combinations and the designated symbol was generated on one of said paylines:

(i) modify the award associated with the formed winning symbol combination with the modifier associated with the payline which the designated symbol was generated on, and (ii) provide the player the modified award.

48. The memory device of claim 47, wherein the plurality of instructions, when executed by the at least one processor, cause the gaming machine select the awards from the group consisting of values, credits, multipliers and free spins.

49. The memory device of claim 47, which is selected from the group consisting of a random access memory, a read only memory, and an application-specific integrated circuit.

* * * * *